US 8,848,119 B2
Sep. 30, 2014

(12) United States Patent
Endo

(10) Patent No.: US 8,848,119 B2
(45) Date of Patent: Sep. 30, 2014

(54) POLARIZATION CONTROL DEVICE, POLARIZATION CONTROL METHOD, AND IMAGE DISPLAY SYSTEM

(71) Applicant: Seiko Epson Corporation, Tokyo (JP)

(72) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 13/747,077

(22) Filed: Jan. 22, 2013

(65) Prior Publication Data

US 2013/0194522 A1     Aug. 1, 2013

(30) Foreign Application Priority Data

Jan. 27, 2012   (JP) .................................. 2012-015703
Jan. 11, 2013   (JP) .................................. 2013-003923

(51) Int. Cl.
   *G02F 1/1335*   (2006.01)
   *G02B 27/26*    (2006.01)

(52) U.S. Cl.
   CPC .......... *G02F 1/133528* (2013.01); *G02B 27/26* (2013.01)
   USPC ............................................. 349/15; 349/96

(58) Field of Classification Search
   USPC ....................................................... 349/15, 96
   See application file for complete search history.

(56) References Cited

U.S. PATENT DOCUMENTS 7,477,206 B2   1/2009   Cowan et al.
7,633,666 B2  12/2009   Lipton et al.

FOREIGN PATENT DOCUMENTS

| JP | A 2-144516     | 6/1990  |
| JP | A 2009-518687  | 5/2009  |
| JP | A 2010-532006  | 9/2010  |
| WO | WO 2007/067493 A2 | 6/2007  |
| WO | WO 2008/156790 A1 | 12/2008 |

*Primary Examiner* — Phu Vu
(74) *Attorney, Agent, or Firm* — Oliff PLC

(57) ABSTRACT

A polarization control device includes a first polarizing liquid crystal panel adapted to convert polarization of a first outgoing light of a right-eye image and a second outgoing light of a left-eye image into a second polarization having a polarization direction different by 90° from a first polarization during a specified period of time from a time point when the external device performs a process of switching from either one of the first outgoing light and the second outgoing light to the other, a polarization plate adapted to transmit the first polarization and to cut off the second polarization, and a second polarizing liquid crystal panel adapted to convert the first polarization from the polarization plate into third polarization and fourth polarization having respective polarization direction different from each other in every predetermined period.

15 Claims, 9 Drawing Sheets

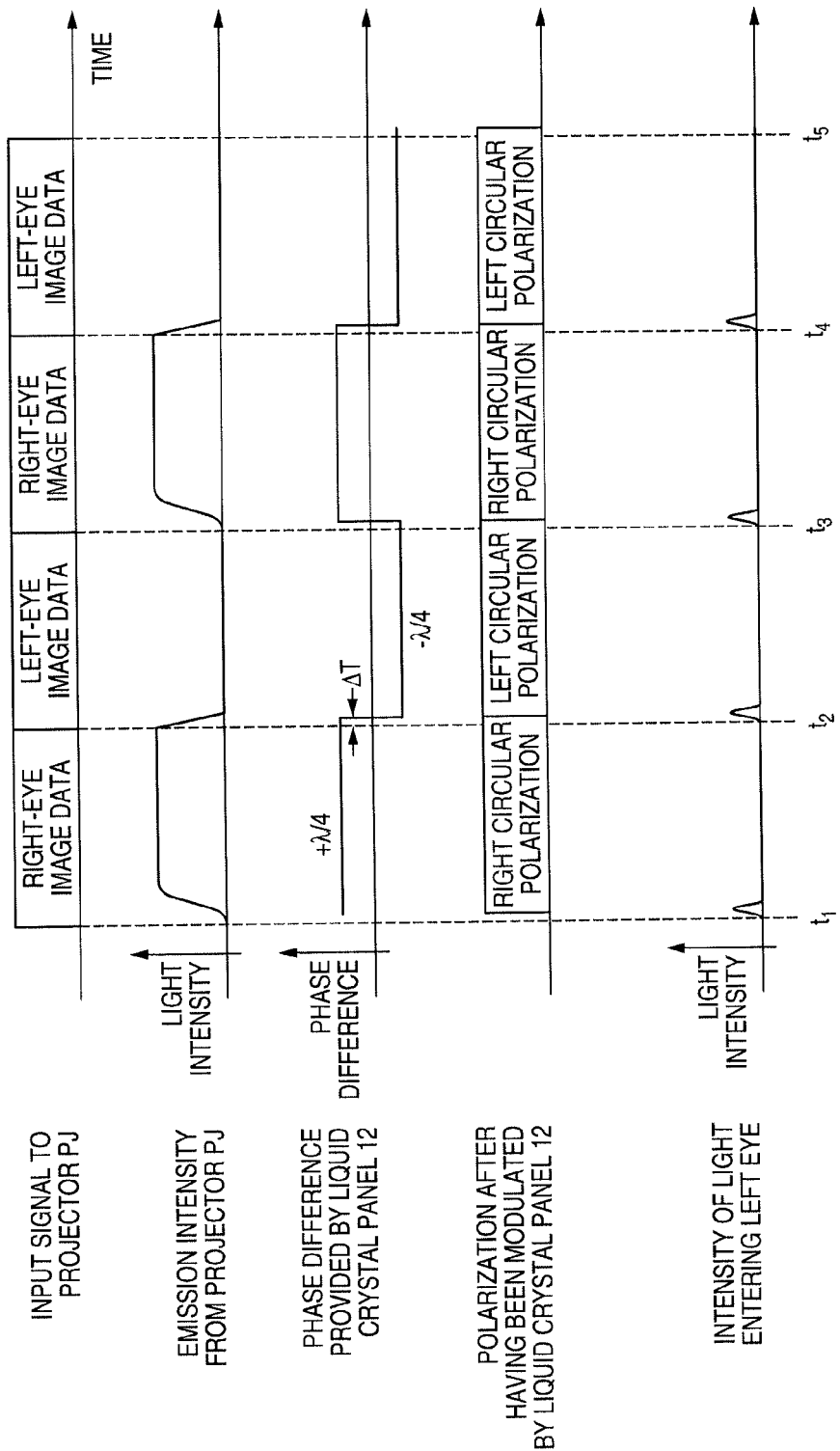

POLARIZATION CONTROL DEVICE, POLARIZATION CONTROL METHOD, AND IMAGE DISPLAY SYSTEM

BACKGROUND

1. Technical Field

The present invention relates to a polarization control device, a polarization control method, and an image display system for performing three-dimensional image display.

2. Related Art

In the past, there has been proposed an image display device for expressing the display image in a three-dimensional manner (see, e.g., JP-A-02-144516 (Document 1)). In this technology, the observer selectively views two parallax images (a right-eye image and a left-eye image described later), which are shifted an amount corresponding to the observing points of the right eye and the left eye with the respective eyes to thereby visually recognize the display image in a three-dimensional manner. Further, there has also been proposed a technology with which a plurality of observers can visually recognize respective images different from each other when the plurality of observers views the projection image from the respective directions different from each other.

As the method of stereoscopically displaying an image, there are known a wavelength separation system, a time-division system, a polarized light system, and so on. The wavelength separation system is a system for projecting two parallax images having respective wavelengths different from each other, and then separating the two parallax images by the difference in wavelength and sorting them into the left eye and the right eye. The time-division system and the polarized light system are advantageous over the wavelength separation system in color reproducibility.

The polarized light system is a system of polarizing the polarization direction of the light emitted from the liquid crystal projector or the liquid crystal display device into two parallax images having respective polarization directions different from each other using a polarization control device in an image display system, and then separating the two parallax images by the difference in polarization direction using a pair of polarization spectacles to thereby sort the two parallax images into the left eye and the right eye (see, e.g., Document 1). In the polarized light system, a silver screen or the like on which the light is difficult to be scattered is used so that the polarization direction is kept before and after the light from, for example, the projector is reflected by the projection surface.

However, in the configuration of Document 1, since the stereoscopic display is performed by the polarized light system using a single projector, the configuration shown in FIG. 8 is adopted as the image display device. The light L1 emitted from the projector PJ is transmitted through the polarization plate 11, then the light L3 is projected on the screen SR after being transmitted through the liquid crystal panel 12, and thus the image is displayed in an enlarged manner.

Here, in the polarized light system shown in FIG. 8, the polarized lights different from each other are projected on the screen in a time-divisional manner in order to perform the stereoscopic display of the image.

Therefore, as shown in FIG. 9, the control voltage is applied to the liquid crystal panel 12 having the slow axis at an angle of 45° with the transmission axis of the polarization plate 11 in a time-divisional manner in sync with the timing at which the projector PJ sequentially emits the light L1 of the right-eye image and the left-eye image. For example, since the right-eye image is emitted from the projector PJ in the period from the time point t1 to the time point t2, the control section 10 provides the liquid crystal panel 12 with the control signal of setting the phase difference to $\lambda/4$. On the other hand, since the left-eye image is emitted from the projector PJ in the period from the time point t2 to the time point t3, the control section 10 provides the liquid crystal panel 12 with the control signal of setting the phase difference to $-\lambda/4$. The process of changing the phase difference is performed in a time-divisional manner.

Thus, the liquid crystal panel 12 emits the light L3 as the right circularly polarized light (e.g., the right-eye image) when the light L2 with the vertical polarization is controlled to have the phase difference of $\lambda/4$, or emits the light L3 as the left circularly polarized light (e.g., the left-eye image) when it is controlled to have the phase difference of $-\lambda/4$. On this occasion, the control section 10 generates the signal for controlling the phase difference based on the information for distinguishing the right-eye image data and the left-eye image data from each other included in the image data supplied to the projector PJ, and then outputs the signal to the liquid crystal panel 12.

Here, the polarization plate 11 is for aligning the polarization of the light L1 input from the projector PJ. In general, although the light L1 is emitted from the projector PJ as the vertically polarized light, the horizontally polarized light is included as a partial component. Therefore, in order to prevent the crosstalk between the right-eye image and the left-eye image, the polarization plate 11 emits only the vertically polarized light component in the light L1 to the liquid crystal panel 12 in the next stage.

A pair of spectacles 50 is worn by the observer in order to view the image displayed on the screen SR as a stereoscopic image. Since the light L3 emitted from the liquid crystal panel 12 is reflected by the screen to thereby be changed to the left circularly polarized light from the right circularly polarized light, or to the right circularly polarized light from the left circularly polarized light, the pair of spectacles 50 for observation (hereinafter also referred to as a pair of observation spectacles 50) is provided with an optical element having a property of transmitting the right circularly polarized light (the left-eye image) disposed on the surface of the left glass 50L, and an optical element having a property of transmitting the left circularly polarized light (the right-eye image) disposed on the surface of the right glass 50R.

Therefore, by wearing the pair of observation spectacles 50, the observer can observe the stereoscopic image in a "pseudo" manner due to the human visual feature since the left eye views the left-eye image and the right eye views the right-eye image.

Further, in response to the supply of the right-eye image data (or the left-eye image data) from an external device (not shown), the projector PJ processes the light L1 for the left-eye image (or the right-eye image) and then outputs the light L1 in a time-divisional manner.

Here, since the converged intense light enters the liquid crystal panel used in the projector PJ, the liquid crystal panel using a liquid crystal material with a high durability is used to avoid the problem of lifetime. However, the liquid crystal material with a high durability takes a long time for varying the orientation of the liquid crystal from when the signal has been applied, and the orientation of the liquid crystal varies gradually. Therefore, as shown in FIG. 9, it results that the orientation of the liquid crystal varies with a time constant until it completely varies from the outgoing light L1 of the left-eye image to the outgoing light L1 of the right-eye image.

On the other hand, since the light L1, which is diffused light, from the projector PJ enters the liquid crystal panel 12 of the polarization control device 100, the liquid crystal panel 12 is not required to have very high durability, and therefore, the liquid crystal with a high rate of variation in the orientation of the liquid crystal is used for the liquid crystal panel 12.

Therefore, the control section 10 applies the signal for controlling the phase difference to the liquid crystal panel 12 at a timing shifted by the time ΔT from the timing at which the image data is switched from either one of the right-eye image data and the left-eye image data to the other.

However, since the timing at which the image data is switched from either one of the right-eye image data and the left-eye image data to the other is different between the orientation states of the liquid crystal, it is unachievable to make the time ΔT constant, and therefore, it is unachievable to completely suppress the crosstalk at the switching timing.

FIG. 9 is a waveform chart showing the control performed when the right-eye image represents all white and the left-eye image represents all black for the sake of explanation. The light of the right-eye image due to the crosstalk enters the left-eye though the left-eye image represents the black display, and it causes blur of the image in the stereoscopic view, and results in the degradation in quality of the display image.

SUMMARY

An advantage of some aspects of the invention is to provide a polarization control device, a polarization control method, and an image display device capable of allowing the observer to observe a stereoscopic image without causing the crosstalk even if the variation rate of the orientation of the liquid crystal is different between the liquid crystal panel in the image display device and the liquid crystal panel for converting the polarization state.

An aspect of the invention is directed to a polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other, and then emit the first outgoing light and the second outgoing light. The polarization control device includes a first polarizing liquid crystal panel adapted to convert polarization of the first outgoing light and the second outgoing light into a second polarization having a polarization direction different by 90° from a first polarization, and emit the first outgoing light and the second outgoing light during a specified time of time from a time point when the external device performs a process of switching from either one of the first outgoing light and the second outgoing light to the other in sync with the process of switching by the external device, a polarization plate having a transmission axis having a polarization direction coinciding with the first polarization, and a second polarizing liquid crystal panel adapted to convert the first polarization of each of the first outgoing light and the second outgoing light input through the polarization plate into third polarization and fourth polarization having respective polarization directions different from each other, and then emit the result in every predetermined period.

According to the configuration described above, even if the timing at which the orientation of the liquid crystal of the internal liquid crystal panel of the image display device is varied and the timing at which the orientation of the liquid crystal of the second polarizing liquid crystal panel for making the polarization direction coincide with the polarization characteristics of each of the right and left glasses of the pair of observation spectacles worn by the observer is varied are different from each other, since the polarization control device according to this aspect of the invention sets the black display (the state of preventing the light from being transmitted) during the specified time of time when the crosstalk visually recognized by the observer occurs in sync with the timing at which the image display device performs the switching process between the right-eye image and the left-eye image, the outgoing light of the image in the period when the crosstalk occurs is prevented from being emitted to the observer, and thus, it is possible to suppress the occurrence of the crosstalk between the right-eye image and the left-eye image in the image of the stereoscopic view observed by the observer.

Another aspect of the invention is directed to the polarization control device according to the above aspect of the invention, wherein the second polarizing liquid crystal panel includes a first polarization panel adapted to polarize the first outgoing light from the first polarization to the third polarization and then emit the first outgoing light in the period of the right-eye image, and emit the second outgoing light directly as the first polarization in the period of the left-eye image, and a second polarization panel adapted to emit the first outgoing light emitted from the first polarization panel directly as the third polarization in the period of the right-eye image, and polarize the second outgoing light emitted from the first polarization panel from the first polarization to the fourth polarization and then emit the second outgoing light in the period of the left-eye image.

According to the above configuration, since the polarization control device according to this aspect of the invention converts the polarization characteristics of each of the right-eye image and the left-eye image from the first polarization into the third polarization, and the fourth polarization, respectively, using the first polarization panel and the second polarization panel, the second polarizing liquid crystal panel can easily be formed from the first polarization panel and the second polarization panel.

Still another aspect of the invention is directed to the polarization control device according to the above aspect of the invention, wherein the first polarization is first linear polarization, the second polarization is second linear polarization having a polarization axis having an angle of 90° with a polarization axis of the first linear polarization, the third polarization is either one of left circular polarization and right circular polarization, and the fourth polarization is the other of the left circular polarization and the right circular polarization, and the second polarizing liquid crystal panel includes a first polarization panel adapted to emit the first outgoing light directly as the first polarization in the period of the right-eye image, and polarize the second outgoing light from the first polarization to the second polarization in the period of the left-eye image, and a retarder adapted to convert the first polarization into the third polarization, and convert the second polarization into the fourth polarization.

According to the above configuration, since the polarization control device of this aspect of the invention uses the liquid crystal panel as the first polarization panel, and the retarder, the second polarizing liquid crystal panel can be configured at a lower cost compared to the case of using the liquid crystal panels for both of the first polarization panel and the second polarization panel.

Yet another aspect of the invention is directed to the polarization control device according to the above aspect of the invention, wherein the first polarization is first linear polarization, the second polarization is second linear polarization having a polarization axis having an angle of 90° with a polarization axis of the first linear polarization, the third polarization is either one of left circular polarization and right circular polarization, and the fourth polarization is the other of the left circular polarization and the right circular polarization, and the second polarizing liquid crystal panel includes a retarder adapted to polarize the first outgoing light and the second outgoing light from the first polarization to the fourth polarization, and then emit the result, and a first polarization panel adapted to polarize the fourth polarization emitted from the retarder to the third polarization and then emit the result in the period of the right-eye image, and emit the fourth polarization directly as the fourth polarization in the period of the left-eye image.

According to the above configuration, since the polarization control device of this aspect of the invention includes the retarder, and the liquid crystal panel as the second polarization panel, the second polarizing liquid crystal panel can be configured at a lower cost compared to the case of using the liquid crystal panels for both of the first polarization panel and the second polarization panel.

Still yet another aspect of the invention is directed to an image display system including an image display device adapted to supply first outgoing light of a right-eye image and second outgoing light of a left-eye image as outgoing lights of parallax images for stereoscopic view in a time-divisional manner with a predetermined period, the polarization control device according to any of the aspects of the invention described above adapted to emit the first outgoing light of the right-eye image with the third polarization, and emit the second outgoing light of the left-eye image with the fourth polarization different from the third polarization, and a pair of observation spectacles having an optical element having a property of transmitting the first outgoing light disposed on a right-eye side, and having an optical element having a property of transmitting the second outgoing light disposed on a left-eye side.

According to the configuration described above, even if the timing at which the orientation of the liquid crystal of the internal liquid crystal panel of the image display device is varied and the timing at which the orientation of the liquid crystal of the second polarizing liquid crystal panel for making the polarization direction coincide with the polarization characteristics of each of the right and left glasses of the pair of observation spectacles worn by the observer is varied are different from each other, since the image display system according to this aspect of the invention sets the black display during the specified time of time when the crosstalk visually recognized by the observer occurs in sync with the timing at which the image display device performs the switching process between the right-eye image and the left-eye image, the outgoing light of the image in the period when the crosstalk occurs is prevented from being emitted to the observer, and thus, it is possible to suppress the occurrence of the crosstalk between the right-eye image and the left-eye image in the image of the stereoscopic view observed by the observer.

Further another aspect of the invention is directed to a polarization control method adapted to control a polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other, and then emit the first outgoing light and the second outgoing light. The method includes converting polarization of the first outgoing light and the second outgoing light into a second polarization having a polarization direction different by 90° from a first polarization, and emitting the first outgoing light and the second outgoing light during a specified time of time from a time point when the external device performs a process of switching from either one of the first outgoing light and the second outgoing light to the other in sync with the process of switching by the external device using a first polarizing liquid crystal panel, and converting the first polarization of each of the first outgoing light and the second outgoing light input through the polarization plate having a transmission axis having a polarization direction coinciding with the first polarization into third polarization and fourth polarization having respective polarization directions different from each other in every predetermined period, and then emitting the result using a second polarizing liquid crystal panel.

According to the configuration described above, even if the timing at which the orientation of the liquid crystal of the internal liquid crystal panel of the image display device is varied and the timing at which the orientation of the liquid crystal of the second polarizing liquid crystal panel for making the polarization direction coincide with the polarization characteristics of each of the right and left glasses of the pair of observation spectacles worn by the observer is varied are different from each other, since the polarization control method according to this aspect of the invention sets the black display during the specified time of time when the crosstalk visually recognized by the observer occurs in sync with the timing at which the image display device performs the switching process between the right-eye image and the left-eye image, the outgoing light of the image in the period when the crosstalk occurs is prevented from being emitted to the observer, and thus, it is possible to suppress the occurrence of the crosstalk between the right-eye image and the left-eye image in the image of the stereoscopic view observed by the observer.

An aspect of the invention is directed to a polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other. The polarization control device includes: a first polarizing liquid crystal panel adapted to switch polarization directions of the first outgoing light and the second outgoing light between a first polarization and a second polarization having a polarization direction different by 90° from the first polarization; a polarization plate that transmits light of the first polarization from the first polarizing liquid crystal panel, and absorbs or reflects light of the second polarization from the first polarizing liquid crystal panel; and a second polarizing liquid crystal panel adapted to convert the first polarization transmitted through the polarization plate into a third polarization and a fourth polarization having a polarization direction different from the third polarization in turn in sync with the predetermined period, the first polarizing liquid crystal panel converting the polarization direction of the first outgoing light and the second outgoing light so that the light of the second polarization is emitted form the first polarizing liquid crystal panel during a specified time of time from a time point when the external device performs a process of switching from either one of the first outgoing light and the second outgoing light to the other in sync with the process of switching by the external device and the light of the first polarization is emitted from the first polarizing liquid crystal panel after a lapse of the specified time.

According to the configuration described above, even if the timing at which the orientation of the liquid crystal of the internal liquid crystal panel of the external device (e.g., the image display device) is varied and the timing at which the orientation of the liquid crystal of the second polarizing liquid crystal panel for making the polarization direction coincide with the polarization characteristics of each of the right and left glasses of the pair of observation spectacles worn by the observer is varied are different from each other, since the polarization control device according to this aspect of the invention sets the black display (the state of preventing the light from being transmitted) during the specified time of time when the crosstalk visually recognized by the observer occurs in sync with the timing at which the image display device performs the switching process between the right-eye image and the left-eye image, the outgoing light of the image in the period when the crosstalk occurs is prevented from being emitted to the observer, and thus, it is possible to suppress the occurrence of the crosstalk between the right-eye image and the left-eye image in the image of the stereoscopic view observed by the observer.

Another aspect of the invention is directed to the polarization control device according to the above aspect of the invention, wherein the second polarizing liquid crystal panel includes a first polarization panel and a second polarization panel. The first polarization panel is adapted to convert the polarization direction of incident light of the first polarization into the third polarization during either one of the period of the right-eye image and the period of the left-eye image, and not convert the polarization direction of incident light during the other of the period of the right-eye image and the period of the left-eye image. The second polarization panel is adapted to convert the polarization direction of incident light of the first polarization into the fourth polarization during the other of the period of the right-eye image and the period of the left-eye image, and not convert the polarization direction of incident light during the one of the period of the right-eye image and the period of the left-eye image.

According to the above configuration, since the polarization control device according to this aspect of the invention converts the polarization direction of each of the right-eye image and the left-eye image from the first polarization into the third polarization, and the fourth polarization, respectively, using the first polarization panel and the second polarization panel, the second polarizing liquid crystal panel can easily be formed from the first polarization panel and the second polarization panel.

Still another aspect of the invention is directed to the polarization control device according to the above aspect of the invention, wherein the second polarizing liquid crystal panel includes a first polarization panel and a retarder. The first polarization panel is adapted to not convert the polarization direction of incident light during either one of the period of the right-eye image and the period of the left-eye image, and convert the polarization direction of incident light into the polarization direction that is different from the polarization direction of the incident light in 90 degrees during the other of the period of the right-eye image and the period of the left-eye image. The retarder is disposed on either one side of a light incident side and a light outgoing side of the first polarization panel and has a retardation of quarter-wavelength.

According to the above configuration, since the polarization control device of this aspect of the invention uses the liquid crystal panel as the first polarization panel, and the retarder, the second polarizing liquid crystal panel can be configured at a lower cost compared to the case of using the liquid crystal panels for both of the first polarization panel and the second polarization panel.

Still yet another aspect of the invention is directed to an image display system including: an image display device having an liquid crystal panel adapted to emit a first outgoing light of a right-eye image and a second outgoing light of a left-eye image as outgoing lights of parallax images for stereoscopic view in a time-divisional manner with a predetermined period; a polarization control device according to any of the aspects of the invention described above adapted to convert either one of the first outgoing light and the second outgoing light into the third polarization, and convert other of the first outgoing light and the second outgoing light into the fourth polarization different from the third polarization; and a pair of observation spectacles having an optical element having a property of transmitting the first outgoing light disposed on a right-eye side, and having an optical element having a property of transmitting the second outgoing light disposed on a left-eye side.

According to the configuration described above, even if the timing at which the orientation of the liquid crystal of the internal liquid crystal panel of the image display device is varied and the timing at which the orientation of the liquid crystal of the second polarizing liquid crystal panel for making the polarization direction coincide with the polarization characteristics of each of the right and left glasses of the pair of observation spectacles worn by the observer is varied are different from each other, since the image display system according to this aspect of the invention sets the black display during the specified time of time when the crosstalk visually recognized by the observer occurs in sync with the timing at which the image display device performs the switching process between the right-eye image and the left-eye image, the outgoing light of the image in the period when the crosstalk occurs is prevented from being emitted to the observer, and thus, it is possible to suppress the occurrence of the crosstalk between the right-eye image and the left-eye image in the image of the stereoscopic view observed by the observer.

BRIEF DESCRIPTION OF THE DRAWINGS

The invention will be described with reference to the accompanying drawings, wherein like numbers reference like elements.

FIG. 9 is a waveform chart for explaining the action of a control section 10 for performing polarization control in a polarization control system according to the related art example.

DESCRIPTION OF EXEMPLARY EMBODIMENTS

First Embodiment

Figure 1:
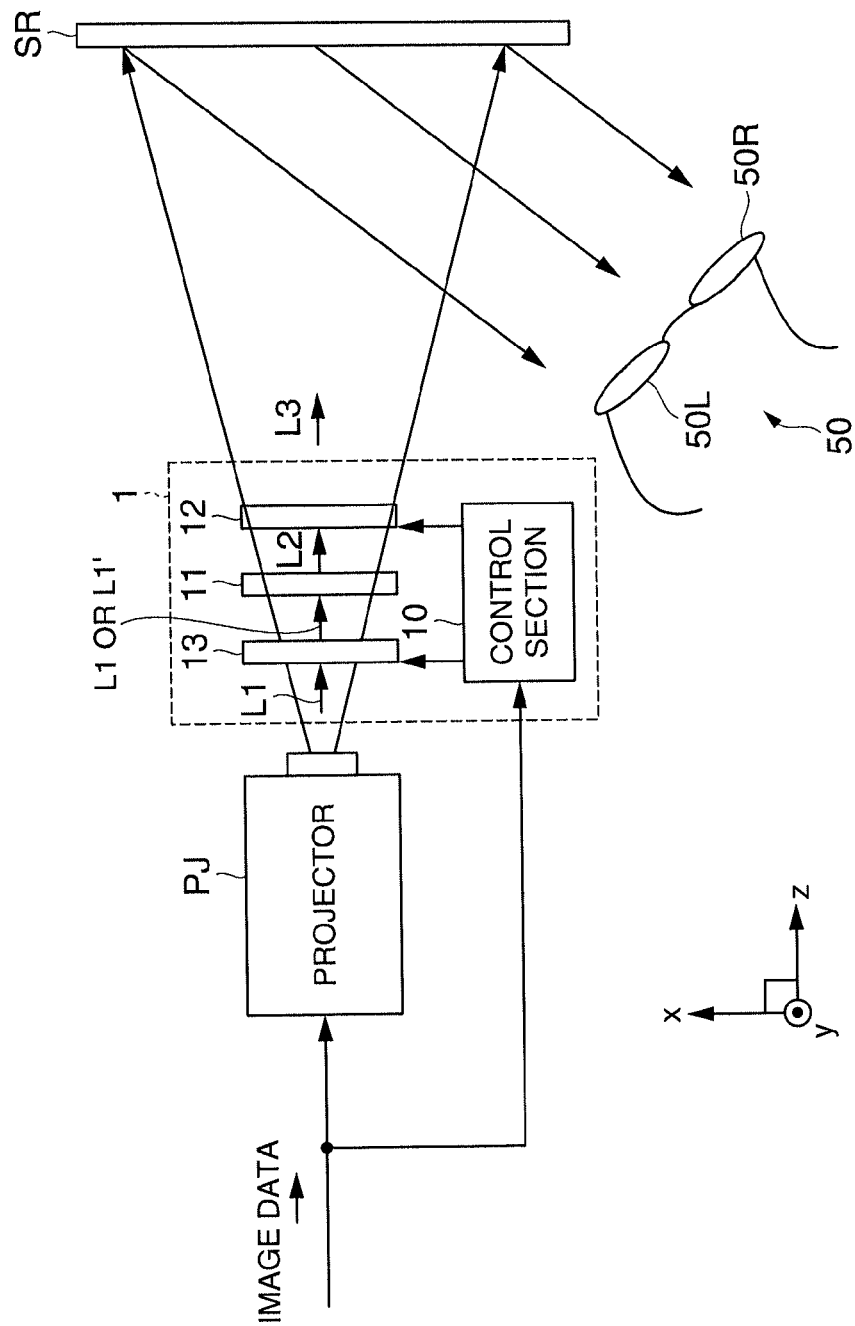
FIG. 1 is a block diagram showing a configuration example of an image display system according to a first embodiment of the invention.

Hereinafter, a first embodiment of the invention will be described with reference to the accompanying drawings. FIG. 1 is a schematic block diagram showing a configuration example of an image display system for performing stereoscopic view of an image using a polarization control device according to the first embodiment of the invention. In the present embodiment, an image display system, which displays the left-eye image and the right-eye image as parallax images for stereoscopic view to a screen SR in a time-divisional manner using a projector PJ, will be explained as an example.

The image display system according to the present embodiment is provided with the projector PJ, a polarization control device 1, the screen SR, and the pair of observation spectacles 50.

The projector PJ converts the left-eye image data and the right-eye image data supplied from an external device into the outgoing light of the image, and then emits them alternately with a certain period in a time-divisional manner as the outgoing light L1 of the right-eye image and the left-eye image. Here, the outgoing light of the right-eye image is defined as a first outgoing light L1R, and the outgoing light of the left-eye image is defined as a second outgoing light L1L. The projector PJ emits the first outgoing light L1R and the second outgoing light L1L having the same polarization directions in a time-divisional manner.

The polarization control device 1 polarizes the first outgoing light L1R and the second outgoing light L1L emitted from the projector PJ into polarized lights (a third polarization and a forth polarization) having the respective polarization directions different from each other, and then emits a first outgoing light L3R and a second outgoing light L3L with a black display having a specified time width inserted in the period of transition from either one of the first outgoing light L1R and the second outgoing light L1L to the other.

To the screen SR, the first outgoing light L3R for the right eye (the third polarization) emitted from the polarization control device 1 and the second outgoing light L3L for the left eye (the forth polarization) having the polarization direction different from that of the second outgoing light L3R for the right eye are projected alternately in a time-divisional manner with a predetermined period.

The pair of observation spectacles 50 is provided with a right-eye glass 50R provided with an optical element having a property of transmitting the first outgoing light L3R for the light eye reflected by the screen SR, and a left-eye glass 50L provided with an optical element having a property of transmitting the second outgoing light L3L for the left eye reflected by the screen SR.

Therefore, when the observer wears the pair of observation spectacles 50 and views the screen SR, it results that the first outgoing light L3R of the right-eye image enters the right eye, and the second outgoing light L3L of the left-eye image enters the left eye, and thus, the pseudo stereoscopic view can be performed with the parallax images. Here, since the projection light (the first outgoing light L3R for the right eye and the second outgoing light L3L for the left eye) is reflected by the screen SR, the projection light entering the pair of observation spectacles 50 is changed in the polarization characteristics. For example, when considering the case in which the projection light is circularly polarized light, it results that in the projection light reflected by the screen SR, the right circularly polarized light is changed to the left circularly polarized light, and the left circularly polarized light is changed to the right circularly polarized light. Therefore, the pair of observation spectacles 50 is provided with an optical element having a property of transmitting the right circularly polarized light (the second outgoing light L3L of the left-eye image) disposed on the left side glass 50L, and an optical element having a property of transmitting the left circularly polarized light (the first outgoing light L3R of the right-eye image) disposed on the right side glass 50R. Further, as each of the optical elements, a wave plate for converting circularly polarized light into linearly polarized light, and a polarization plate for transmitting the desired linearly polarized light are disposed. The configuration of combining the wave plate and the polarization plate may be referred to as a circularly polarizing plate in some cases. In the preset specification, as the optical elements used on the surface of the left side glass 50L and the surface of the right side glass 50R of the pair of observation spectacles 50, any optical elements having a property of transmitting the desired circularly polarized light including the circularly polarizing plate obtained by combining the wave plate and the polarization plate described above may be used.

Further, the polarization control device 1 is provided with a control section 10, a polarizing liquid crystal panel 13 (a first polarizing liquid crystal panel), a polarization plate 11, and a liquid crystal panel 12 (a second polarizing liquid crystal panel).

The control section 10 is supplied with the image data substantially the same as that supplied to the projector PJ, and extracts the identification information for identifying the right-eye image data and the left-eye image data included in the image data.

Further, the control section 10 detects switching timing at which a switching process of switching the image represented by the outgoing light L1 from either one of the right-eye image and the left-eye image to the other is performed in the inside of the projector PJ using the identification information thus detected. Here, the outgoing light L1 represents both of the first outgoing light L1R and the second outgoing light L1L.

Then, the control section 10 outputs the control information representing which one of the right-eye image and the left-eye image is emitted from the projector PJ to each of the polarizing liquid crystal panel 13 and the liquid crystal panel 12 in sync with the timing of performing the switching process.

In the present embodiment, the first outgoing light L1R of the right-eye image and the second outgoing light L1L of the left-eye image emitted from the projector PJ are each emitted as polarized light having the same polarization direction, for example, vertically polarized light in the linearly polarized light. It should be noted that in the present embodiment, the explanation will be presented defining that the polarization state in which the light propagates in the z-axis direction and has the polarization axis in the x-axis direction (the vertical direction in the drawing) is the vertically polarized light, and the polarization state in which the light propagates in the z-axis direction and has the polarization axis in the y-axis direction (the direction perpendicular to the plane including the x-axis and the z-axis) is the horizontally polarized light.

The polarizing liquid crystal panel 13 as the first polarizing liquid crystal panel in the present embodiment includes liquid crystal as an electro-optic material, a pair of light transmissive substrates between which the liquid crystal is hermetically sealed and a polysilicon TFTs as the switching elements, for example. The polarizing liquid crystal panel 13 controls the orientation of the liquid crystal according to provided controlled signals so as to modulate incident polarized light. The polarizing liquid crystal panel 13 has the slow axis having an angle of 45° with the polarization direction of the outgoing light L1, namely the polarization axis, and the presence or absence of occurrence of the phase difference of a half wavelength is controlled in accordance with whether or not the voltage is applied. For example, in the polarizing liquid crystal panel 13, the phase difference of a half wavelength occurs in the ON state in which the voltage is applied, and the phase difference of a half wavelength does not occur in the OFF state in which the voltage is not applied. Therefore, the polarizing liquid crystal panel 13 emits the outgoing light L1 having the polarization direction of the vertical polarization (the first polarization) passing therethrough as the horizontally polarized (the second polarization) light with the polarization axis rotated 90° for the specified time of time from the time point when the control information described above is supplied.

The polarization plate 11 has the same transmission axis as the polarization direction (the first polarization) of the outgoing light L1 emitted from the projector PJ.

Therefore, the polarization plate 11 transmits only the polarized light (the first polarization) having the polarization direction coinciding with the transmission axis out of the outgoing light L1 emitted from the polarizing liquid crystal panel 13. Therefore, since the polarization plate 11 transmits only the vertically polarized light (the first polarization) and absorbs or reflects the horizontally polarized light (the second polarization), the image is set to the image of black display during the specified time described above in which the horizontally polarized light (the second polarization) is emitted from the polarizing liquid crystal panel 13. Thus, since the black display is performed in the time region in the switching from either one of the right-eye image and the left-eye image to the other, the crosstalk between the right-eye image and the left-eye image can be prevented from occurring.

The polarizing liquid crystal panel 12 as the second polarizing liquid crystal panel in the present embodiment includes liquid crystal as an electro-optic material, a pair of light transmissive substrates between which the liquid crystal is hermetically sealed and a polysilicon TFTs as the switching elements, for example. The polarizing liquid crystal panel 13 controls the orientation of the liquid crystal according to provided controlled signals so as to modulate incident polarized light. The liquid crystal panel 12 converts the first outgoing light L1R and the second outgoing light L1L input thereto into the polarized lights (the third polarization and the forth polarization) having the respective polarization directions different from each other in accordance with the information representing which one of the right-eye image and the left-eye image is displayed included in the control information supplied from the control section 10.

For example, the liquid crystal panel 12 converts the first outgoing light L1R of the right-eye image into the right circularly polarized light (the third polarization), and the second outgoing light L1L of the left-eye image into the left circularly polarized light (the forth polarization), and then emits them. In this case, in the pair of observation spectacles 50 for observing the first outgoing light L3R and the second outgoing light L3L reflected by the screen SR, the polarization direction of the polarized light transmitted through the right-eye side glass 50R is set to the left circular polarization, and the polarization direction of the polarized light transmitted through the left-eye side glass 50L is set to the right circular polarization. In the other case, in the pair of observation spectacles for observing the first outgoing light L3R and the second outgoing light L3L transmitted through the screen SR, the polarization direction of the polarized light transmitted through the right-eye side glass is set to the right circular polarization, and the polarization direction of the polarized light transmitted through the left-eye side glass 50L is set to the left circular polarization.

Further, it is also possible for the liquid crystal panel 12 to have a configuration of transmitting the first outgoing light L1R of the right-eye image while keeping it as the vertically polarized light in the linearly polarized light, and converting the second outgoing light L1L of the left-eye image into the horizontally polarized light, and then emitting the horizontally polarized light. In this case, in the pair of observation spectacles 50, the polarization direction of light transmitted through the right-eye side glass 50R is set to the vertical polarization, and the polarization direction of light transmitted through the left-eye side glass 50L is set to the horizontal polarization.

Figure 2:
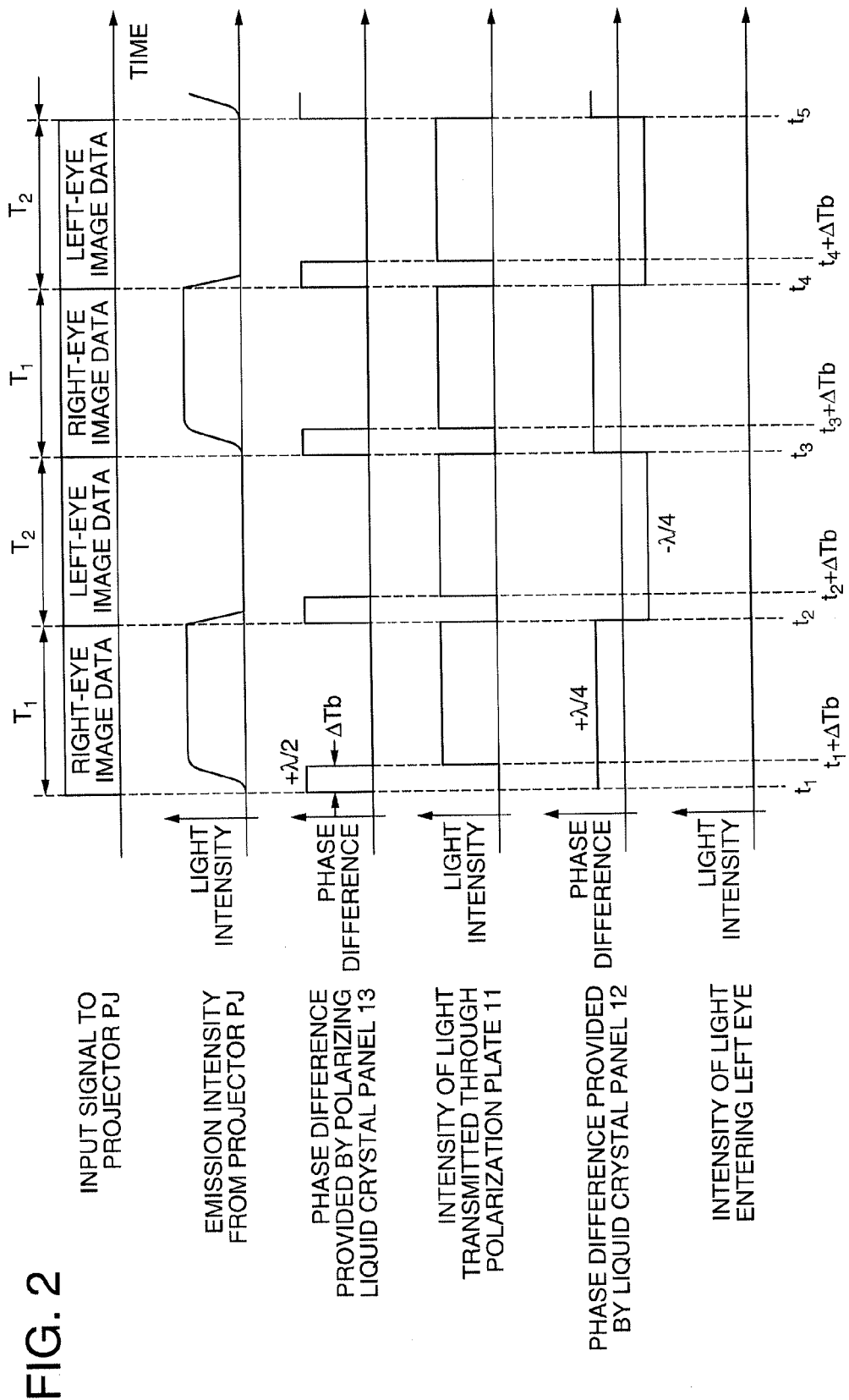
FIG. 2 is a waveform chart for explaining the action of a control section 10 for performing polarization control in a polarization control system according to the first embodiment.

Further, FIG. 2 is a waveform chart for explaining the action of the control section 10 for performing polarization control in a polarization control system according to the first embodiment. FIG. 2 shows an amount of the light entering the left eye of the observer due to the crosstalk generated by the first outgoing light L3R in the case in which the image data of setting the right-eye image to the white display and setting the left-eye image to the black display is supplied from the external device. In the explanation described below, it is assumed that the liquid crystal panel 12 has the slow axis having an angle of 45° with the polarization direction of the vertical polarization. The liquid crystal panel 12 also has a configuration of retarding the phase of the outgoing light L1 of the first polarization from the polarization plate 11 by ¼ wavelength to polarize the light to the right circularly polarized light (the third polarization), when the control signal to retard the phase by ¼ wavelength is input into the liquid crystal panel 12 by the control section 10; and leading the phase of the outgoing light L1 of the first polarization from the polarization plate 11 by ¼ wavelength to polarize the light to the left circularly polarized light (the forth polarization), when the control signal to lead the phase by ¼ wavelength is input into the liquid crystal panel 12 by the control section 10.

Then, the projector PJ is supplied with each of the right-eye image data and the left-eye image data from an external device (not shown) in the period T1 and the period T2, respectively, alternately in a time-divisional manner. Here, the right-eye image data includes right side identification information for identifying the right-eye image, and the left-eye image data includes left side identification information for identifying the left-eye image. Thus, the projector PJ emits the right-eye image data in the period T1 as the first outgoing light L1R of the right-eye image, while emitting the left-eye image data in the period T2 as the second outgoing light L1L of the left-eye image.

Time Point t1:

The external device outputs the right-eye image data to the projector PJ.

When the right-eye image data is supplied, the projector PJ controls internal liquid crystal panels of the liquid crystal light valves 100R, 100G, and 100B described later using the right-eye image data to thereby vary the liquid crystal molecular orientation in the liquid crystal panels. Then the projector PJ emits the first outgoing light L1R of the right-eye image.

Further, when the right-eye image data is supplied, the control section 10 detects that the timing of switching from the second outgoing light L1L of the left-eye image to the first outgoing light L1R of the right-eye image is reached.

At this moment, the control section 10 applies a predetermined voltage to the polarizing liquid crystal panel 13 as the control signal in sync with the timing of switching from the second outgoing light L1L of the left-eye image to the first outgoing light L1R of the right-eye image.

Then, the polarizing liquid crystal panel 13 is set to the ON state due to the voltage applied to the polarizing liquid crystal panel 13, and thus the phase difference of a half wavelength occurs in the thickness direction of itself.

Thus, the polarizing liquid crystal panel 13 converts the first outgoing light L1R input thereto, which is vertically polarized light, into horizontally polarized light (the second polarization), and then emits it as the outgoing light L1'R.

On this occasion, the polarization plate 11 absorbs or reflects but does not transmit the outgoing light L1'R since the outgoing light L1'R input from the polarizing liquid crystal panel 13 is the horizontally polarized light (the second polarization), and has a polarization direction different from the transmission axis of itself.

Further, since this moment is included in the period T1 for emitting the right-eye image, the control section 10 outputs the control signal for retarding the phase by ¼ wavelength to the liquid crystal panel 12.

Then, since the control signal for retarding the phase by ¼ wavelength is input, the liquid crystal panel 12 sets the phase difference to ¼ wavelength to thereby set the state of converting the first outgoing light L2R input as the vertically polarized light (the first polarization) into the first outgoing light L3R with the right circular polarization (the third polarization) and then emitting the outgoing light L3R.

However, since the outgoing light L1'R emitted from the polarizing liquid crystal panel 13 is not transmitted through the polarization plate 11 at this moment, the first outgoing light L2R is not input to the liquid crystal panel 12. Thus the image projected on the screen SR is the state of the black display.

Accordingly even if the timing at which the liquid crystal molecular orientation of liquid crystal panels of the liquid crystal light valves 100R, 100G, and 100B in the projector PJ is varied and the timing at which the liquid crystal molecular orientation of the liquid crystal panel 12 is varied are different from each other, light is not emit from the polarization control device 1 during the specified time ΔTb. Since the black display is inserted during the specified time ΔTb, the crosstalk between the right-eye image and the left-eye image is not visually recognized by the observer or the crosstalk is difficult to visually recognize by the observer.

Time Point t1+ΔTb:

Then, when detecting that the specified time ΔTb has elapsed from the timing of switching from the second outgoing light L1L of the left-eye image to the first outgoing light L1R of the right-eye image using an internal counter, the control section 10 stops applying the voltage to the polarizing liquid crystal panel 13.

Thus, the phase difference of a half wavelength in the thickness direction of the polarizing liquid crystal panel 13 disappears. Therefore, the polarizing liquid crystal panel 13 directly emits the first outgoing light L1R input thereto as the vertically polarized light (the first polarization).

Therefore, the polarization plate 11 transmits the first outgoing light L1R and emits it as the first outgoing light L2R since the first outgoing light L1R input from the polarizing liquid crystal panel 13 is the vertically polarized light (the first polarization), and has a polarization direction coinciding with the transmission axis of itself.

Then, since the control signal for retarding the phase by ¼ wavelength is input, the liquid crystal panel 12 sets the phase difference to ¼ wavelength to thereby set the state of converting the first outgoing light L2R input as the vertically polarized light (the first polarization) into the first outgoing light L3R with the right circular polarization (the third polarization) and then emitting the outgoing light L3R.

Thus, the liquid crystal panel 12 projects the right-eye image to the screen SR using the outgoing light L3R with the right circular polarization.

Accordingly after a lapse of the specified time ΔTb, since the first outgoing light L3R from the projector PJ is transmitted through the right-eye glass 50R of the pair of observation spectacles 50, and the first outgoing light L3R from the projector PJ is cut off at the left-eye glass 50L of the pair of observation spectacles 50, the observer can recognize the right-eye image (the first outgoing light L3L) only with the right eye.

Time Point t2:

Since the period T1 for displaying the right-eye image is terminated and the period T2 for displaying the left-eye image is started, the external device outputs the left-eye image data to the projector PJ.

When the left-eye image data is supplied, the projector PJ controls the internal liquid crystal panels of the liquid crystal light valves 100R, 100G, and 100B described later using the left-eye image data to thereby vary the liquid crystal molecular orientation in the liquid crystal panels. Then the projector PJ emits the second outgoing light L1L of the left-eye image.

Further, when the left-eye image data is supplied, the control section 10 detects that the timing of switching from the first outgoing light L1R of the right-eye image to the second outgoing light L1L of the left-eye image is reached.

At this moment, the control section 10 applies a predetermined voltage to the polarizing liquid crystal panel 13 as the control signal in sync with the timing of switching from the first outgoing light L1R of the right-eye image to the second outgoing light L1L of the left-eye image.

Then, the polarizing liquid crystal panel 13 is set to the ON state due to the voltage applied to the polarizing liquid crystal panel 13, and thus the phase difference of a half wavelength occurs in the thickness direction of itself.

Thus, the polarizing liquid crystal panel 13 converts the second outgoing light L1L input thereto, which is vertically polarized light, into horizontally polarized light (the second polarization), and then emits it as the outgoing light L1'L.

On this occasion, the polarization plate 11 absorbs or reflects but does not transmit the outgoing light L1'L since the outgoing light L1'L input from the polarizing liquid crystal panel 13 is the horizontally polarized light (the second polarization), and has a polarization direction different from the transmission axis of itself.

Further, since this moment is included in the period T2 for emitting the left-eye image, the control section 10 outputs the control signal for leading the phase by ¼ wavelength to the liquid crystal panel 12.

Then, since the control signal for leading the phase by ¼ wavelength is input, the liquid crystal panel 12 sets the phase difference to −¼ wavelength to thereby set the state of converting the second outgoing light L2L input as the vertically polarized light (the first polarization) into the second outgoing light L3L with the left circular polarization (the forth polarization) and then emitting the second outgoing light L3L.

However, since the outgoing light L1'L emitted from the polarizing liquid crystal panel 13 is not transmitted through the polarization plate 11 at this moment, the second outgoing light L2L is not input to the liquid crystal panel 12. Thus the image projected on the screen SR is the state of the black display.

Accordingly even if the timing at which the liquid crystal molecular orientation of liquid crystal panels of the liquid crystal light valves 100R, 100G, and 100B in the projector PJ is varied and the timing at which the liquid crystal molecular orientation of the liquid crystal panel 12 is varied are different from each other, light is not emit form the polarization control device 1 during the specified time ΔTb. Since the black display is inserted during the specified time ΔTb, the crosstalk is not visually recognized by the observer or the crosstalk is difficult to visually recognize by the observer.

Time Point t2+ΔTb:

Then, when detecting that the specified time ΔTb has elapsed from the timing of switching from the first outgoing light L1R of the right-eye image to the second outgoing light L1L of the left-eye image using an internal counter, the control section 10 stops applying the voltage to the polarizing liquid crystal panel 13.

Thus, the phase difference of a half wavelength in the thickness direction of the polarizing liquid crystal panel 13 disappears. Therefore, the polarizing liquid crystal panel 13 directly emits the second outgoing light L1L input thereto as the vertically polarized light (the first polarization).

Therefore, the polarization plate 11 transmits the second outgoing light L1L and emits it as the second outgoing light L2L since the second outgoing light L1L input from the polarizing liquid crystal panel 13 is the vertically polarized light (the first polarization), and has a polarization direction coinciding with the transmission axis of itself.

Then, since the control signal for leading the phase by ¼ wavelength is input, the liquid crystal panel 12 sets the phase difference to −¼ wavelength to thereby set the state of converting the second outgoing light L2L input as the vertically polarized light (the first polarization) into the second outgoing light L3L with the left circular polarization (the forth polarization) and then emitting the outgoing light L3L.

Thus, the liquid crystal panel 12 projects the left-eye image to the screen SR using the second outgoing light L3L with the left circular polarization (the forth polarization).

Accordingly after a lapse of the specified time ΔTb, since the second outgoing light L3L from the projector PJ is cut off at the right-eye glass 50R of the pair of observation spectacles 50, and the second outgoing light L3L from the projector PJ is transmitted through the left-eye glass 50L of the pair of observation spectacles 50, the observer can recognize the left-eye image (the first outgoing light L3L) only with the left eye.

Subsequently, in the image display system according to the present embodiment, the processes at the time points from t1 through t2+ΔTb described above are repeatedly performed in the period T1 for displaying the right-eye image and the period T2 for displaying the left-eye image period by period.

Further, the length of the specified time ΔTb for converting the vertically polarized light into the horizontally polarized light by the polarizing liquid crystal panel 13 (i.e. emitting the second polarization) in order to reduce the crosstalk is obtained by an experiment by a plurality of observers. Specifically, it results that if the time ΔTb is too long, there occurs a flicker noise visually recognized by the observer, and if the time ΔTb is too short, there occurs the crosstalk noise visually recognized by the observer. Therefore, using the image data easy to generate the crosstalk noise, the observers are made to observe the image every time the time ΔTb is varied. Then, the time ΔTb with which a stereoscopic image a plurality of observers can view with satisfaction can be obtained is determined.

As described above, in the present embodiment, the outgoing light L1 with the vertical polarization is converted into the outgoing light L1' with the horizontal polarization (the second polarization) by the polarizing liquid crystal panel 13 to thereby prevent the outgoing light L1 from being transmitted through the polarization plate 11 to set the state of the black display at the timing of switching from either one of the first outgoing light L1R of the right-eye image and the second outgoing light L1L of the left-eye image to the other, namely in the transition from either one of the periods T1 and T2 to the other for the specified time ΔTb from the commencement of the other period.

Therefore, according to the present embodiment, it is possible to eliminate the crosstalk caused by either one of the first outgoing light L1R of the right-eye image and the second outgoing light L1L of the left-eye image seeping into the period of the other after switching from the one outgoing light to the other outgoing light, and it is possible for the observer to observe a high-quality stereoscopic image.

Further, although in the present embodiment the explanation is presented taking the image display system of a three-dimensional image using the projector as an example, it is possible to attach the polarization control device to the display surface of the screen of a liquid crystal television (TV) for performing the 3D image display to thereby constitute an image display system using the liquid crystal TV for performing the 3D image display. Also in this case, it is premised that the outgoing light of the right-eye image and the left-eye image emitted from the liquid crystal TV is the vertically polarized light.

Further, in the present embodiment the explanation is presented assuming that the outgoing light L1 of the vertically polarized light emit from the projector PJ, the first polarization is the vertically polarized light, the second polarization is the horizontally polarized light, the third polarization is the right circularly polarized light, the forth polarization is the left circularly polarized light. However, the first polarization, the second polarization, the third polarization and the forth polarization could be choose among linearly polarized light, elliptically polarized light and circularly polarized light, as long as the polarization directions of the first polarization and the second polarization are different from each other and the polarization directions of the third polarization and the forth polarization are different from each other.

For example, in the present embodiment the explanation is presented assuming that the outgoing light emitted from the projector PJ is the vertically polarized light, if the outgoing light is the horizontally polarized light, the transmission axis of the polarization plate 11 is set to the horizontal polarization. On this occasion, when the voltage is applied for the specified time ΔTb, the polarizing liquid crystal panel 13 converts the outgoing light L1 as the horizontally polarized light into the vertically polarized light. In other words, in this case, the first polarization is the horizontally polarized light, and the second polarization is the vertically polarized light. Further, the slow axis of the liquid crystal panel 12 is also set so as to convert the horizontally polarized light (the first polarization) into the right circularly polarized light (the third polarization) and the left circularly polarized light (the forth polarization).

Further, in the present embodiment the explanation is presented assuming that the polarizing liquid crystal panel 13 converts the outgoing light L1 of the vertically polarized light (the first polarization) into the outgoing light L1 of the horizontally polarized light (the second polarization), when the polarizing liquid crystal panel 13 is applied the voltage during the specified time ΔTb from the commencement of each period of the periods T1 and T2, but not be limited to. For example, in the case that the outgoing light is the vertically polarized light and the polarization plate 11 transmits the horizontally polarized light (the first polarization), the polarizing liquid crystal panel 13 is not applied the voltage during the specified time ΔTb from the commencement of each period of the periods T1 and T2, thereby emitting the outgoing light L1 while keeping it as the vertically polarized light (the second polarization), then the outgoing light L1 of the vertically polarized light (the second polarization) is cut off at the polarization plate 11. After a lapse of the specified time ΔTb, the polarizing liquid crystal panel 13 is applied the voltage, thereby emitting the outgoing light L1 that is converted the polarization direction into the horizontally polarized light (the first polarization), then the outgoing light L1 of the horizontally polarized light (the first polarization) is transmitted through the polarization plate 11.

In other words, the polarization direction of the outgoing light L1, the slow axis direction of the polarizing liquid crystal panel 13, the applied voltage to the polarizing liquid crystal panel 13 and the transmission axis direction of the polarization plate 11 could be appropriately set so that in the transition from either one of the periods T1 and T2 to the other, the second polarization is emitted from the polarizing liquid crystal panel 13 then the second polarization is cut off at the polarization plate 11 during the specified time ΔTb from the commencement of the other period, and after a lapse of the specified time ΔTb, the first polarization is emitted from the polarizing liquid crystal panel 13 then the first polarization is transmitted through the polarization plate 11.

Further, in the present embodiment the explanation is presented assuming that the liquid crystal panel 12 retards the phase of the outgoing light L2 by ¼ wavelength in the period T1, and the liquid crystal panel leads the phase of the outgoing light L2 by ¼ wavelength in the period T2, but not be limited to. For example, the liquid crystal panel 12 could lead the phase of the outgoing light L2 by ¼ wavelength in the period T1, and the liquid crystal panel 12 could retard the phase of the outgoing light L2 by ¼ wavelength in the period T2.

Further, in the present embodiment the explanation is presented assuming that the liquid crystal panel 12 retards the phase of the outgoing light L2 in the period T1, and the liquid crystal panel 12 leads the phase of the outgoing light L2 in the period T2, but not be limited to. For example, the liquid crystal panel 12 could vary the phase of the outgoing light L2 by ½ wavelength in the period T1 and the liquid crystal panel 12 could keep the phase of the outgoing light L2 without vary in the phase in the period T2. In this case the liquid crystal panel 12 changes the first polarization to the third polarization in the period T1 and the liquid crystal panel 12 directly emits the first polarization as the forth polarization (i.e. the polarization direction of the first polarization is same as the polarization direction of the fourth polarization). Furthermore, the liquid crystal panel 12 could keep the phase of the outgoing light L2 without vary in the phase in the period T1 and the liquid crystal panel 12 could vary the phase of the outgoing light L2 by ½ wavelength in the period T2.

In other words, the slow axis direction of the liquid crystal panel 12, the phase difference in the thickness of the liquid crystal panel 12, and the applied voltage to the liquid crystal panel 12 could be appropriately set so that in the periods T1 the third polarization is emitted from the liquid crystal panel 12, and in the period T2 the fourth polarization is emitted from the liquid crystal panel 12.

Figure 3:
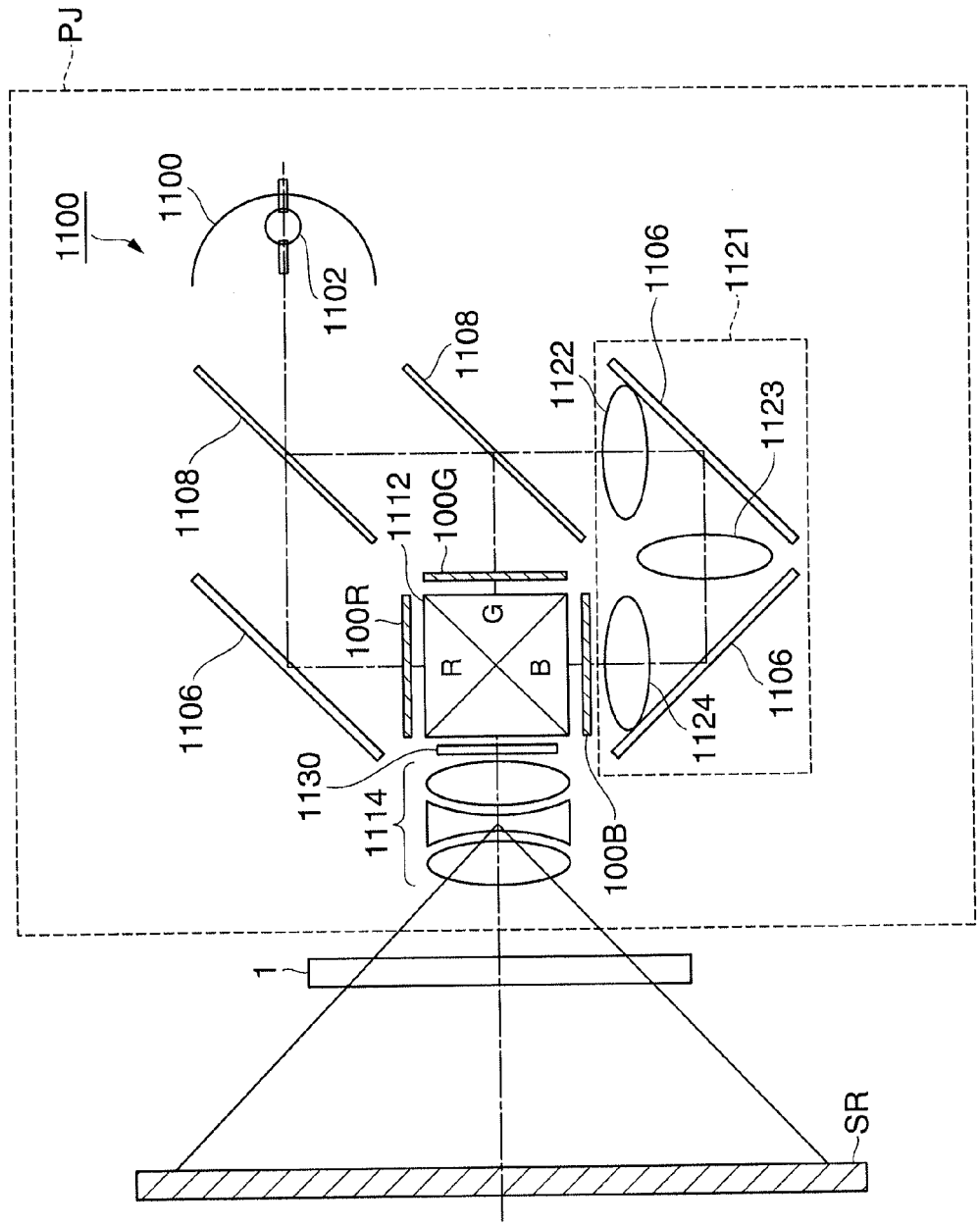
FIG. 3 is a schematic configuration diagram showing a configuration example of a three-panel projection liquid crystal display device (a liquid crystal projector) as an example of a projector PJ (a projection liquid crystal device) according to the present embodiment.

Then, FIG. 3 is a schematic configuration diagram showing an example of a so-called three-panel projection liquid crystal display device (a liquid crystal projector) using three liquid crystal light valves as an example of a projector PJ (a projection liquid crystal device) according to the present embodiment. In the drawing, the reference numeral 1100 denotes a light source, the reference numeral 1108 denotes a dichroic mirror, the reference numeral 1106 denotes a reflecting mirror, the reference numerals 1122, 1123, and 1124 denote relay lenses, the reference symbols 100R, 100G, and 100B denote liquid crystal light valves, the reference numeral 1112 denote a cross-dichroic prism, and the reference numeral 1114 denotes a projection lens system.

The light source 1100 is composed of a lamp 1102 such as a metal halide lamp, and a reflector 1101 for reflecting the light of the lamp 1102. The dichroic mirror 1108 for reflecting blue light and green light transmits red light out of white light emitted form the light source 1100, and at the same time reflects the blue light and the green light. The red light thus transmitted is reflected by the reflecting mirror 1106, and then enters the red-light liquid crystal light valve 100R. Here, the Red-Green-Blue (RGB) components of the image data are respectively controlled as the red light, the green light, and the blue light.

In addition, a polarization direction of the light emitted from the light source 1100 is arranged in one direction by a polarization conversion element disposed between the light source 1100 and the dichroic mirror 1108.

On the other hand, the green light out of the colored lights reflected by the dichroic mirror 1108 is reflected by the dichroic mirror 1108 for reflecting the green light, and then enters the green-light liquid crystal light valve 100G. On the other hand, the blue light is transmitted through the second dichroic mirror 1108. In order to compensate the light path length different from those of the green light and the red light, a light guide 1121 formed of a relay lens system including the entrance lens 1122, the relay lens 1123, and the exit lens 1124 is provided to the blue light, and the blue light enters the blue-light liquid crystal light valve 100B via the light guide 1121.

Each of the liquid crystal light valves 100R, 1000, and 100B includes a liquid crystal panel, a light incident side polarizing plate disposed on the light incident side of the liquid crystal panel, and a light outgoing side polarizing plate disposed on the light outgoing side of the liquid crystal panel. The liquid crystal panel includes liquid crystal as an electro-optic material, a pair of light transmissive substrates between which the liquid crystal is hermetically sealed and a polysilicon TFTs as the switching elements, for example. The liquid crystal panel controls the orientation of the liquid crystal according to provided image signals so as to modulate polarized light emitted from the light incident side polarizing plate. Of the light modulated in the liquid crystal panel, only the light components having a polarization direction along the transmission axis of the light outgoing side polarizing plate come out from the light outgoing side polarizing plate.

The three colored lights modulated by the respective liquid crystal light valves 100R, 100G, and 100B enter the cross dichroic prism 1112. This prism is formed by bonding four rectangular prisms to each other, and is provided with a first dielectric multilayer film for reflecting the red light and a second dielectric multilayer film for reflecting the blue light formed on the inside surfaces so as to form a crisscross. The three colored lights are combined by these dielectric multilayer films to thereby form the light for expressing a color image. The light thus combined is emitted to the polarization control device 1 by the projection lens system 1114 as the projection optical system, and the outgoing light L3 is projected on the screen SR via the polarization control device 1, and thus the image is displayed in an enlarged manner.

Here, for preventing from a decrease in the rate of utilization of light in the cross dichroic prism 1112, the green light (p-polarized light) is emitted from the dichroic mirror 1108 as a component of the composite light, which is the polarized light having the polarization axis different by 90° from those of the other colored lights, namely the red light (s-polarized light) and the blue light (s-polarized light).

Therefore, in order to use the device as the projector PJ according to the present embodiment, it is necessary to dispose a color phase plate 1130 for rotating the polarization axis of the green light by 90° between the dichroic mirror 1108 and the projection lens system 1114, or on the exit side of the projection lens system 1114. FIG. 3 shows an example having the color phase plate 1130 disposed between the dichroic mirror 1108 and the projection lens system 1114. The color phase plate 1130 has a function of rotating the polarization axis of only the light in a specific wavelength band, namely the wavelength band of the green light by 90°. As an element having such a function, there is known, for example, an element described in the specification of the U.S. Pat. No. 5,751,384. Therefore, in the present embodiment, the color phase plate 1130 transmits the red light and the blue light emitted as the vertically polarized light while keeping the polarization axis, and converts the green light with the horizontal polarization into the vertically polarized light by rotating the polarization axis by 90° to thereby emit the outgoing light L1 having all of the red light, the green light, and the blue light as the vertically polarized light as described above. Alternatively, the color phase plate 1130 could has a function of rotating the polarization axis of only the light in the wavelength band of the red and blue light by 90°. In this case the color phase plate 1130 emits the outgoing light L1 having all of the red light, the green light, and the blue light as the horizontally polarized light.

Second Embodiment

Figure 4:
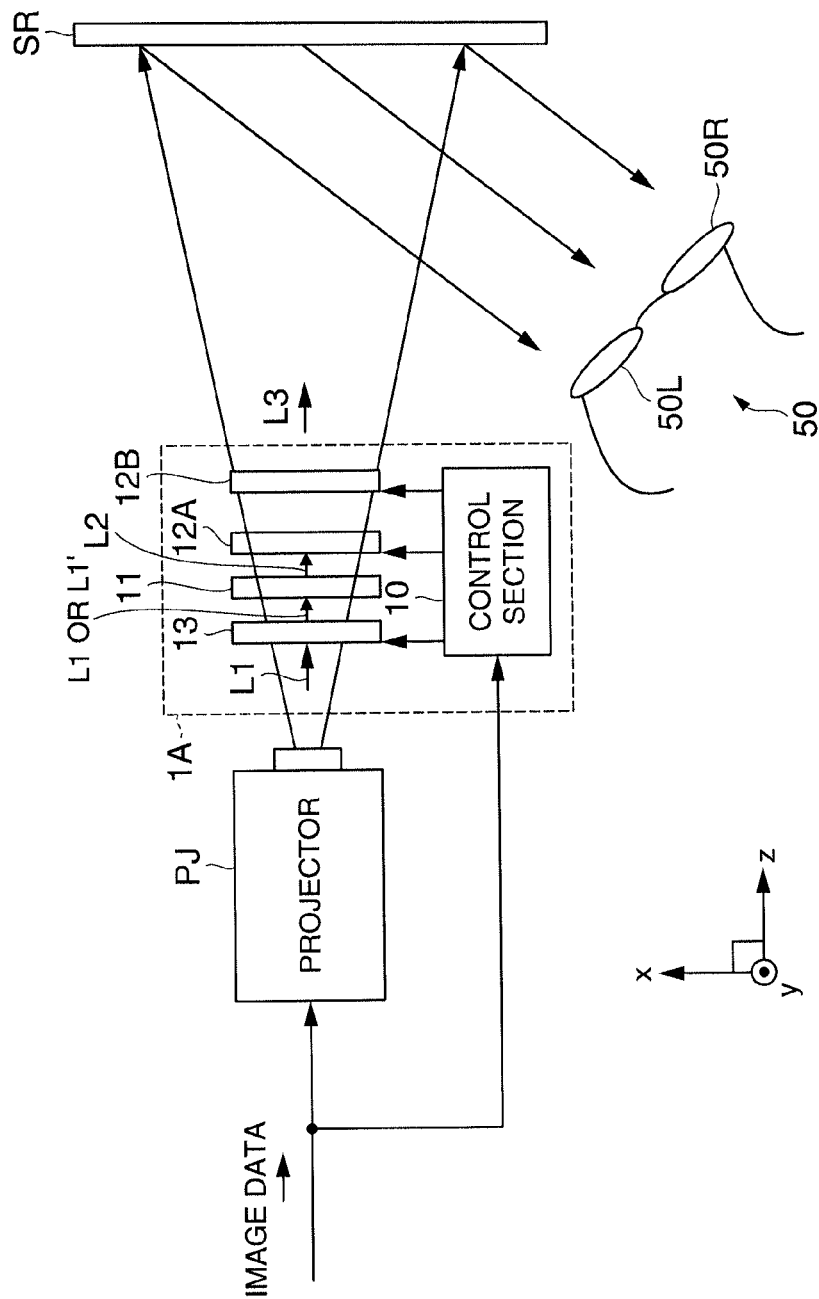
FIG. 4 is a schematic block diagram showing a configuration example of an image display system for performing stereoscopic view of an image using the polarization control device according to a second embodiment of the invention.

Then, a second embodiment of the invention will be explained with reference to the accompanying drawings. FIG. 4 is a schematic block diagram showing a configuration example of an image display system for performing stereoscopic view of an image using a polarization control device according to the second embodiment of the invention. Similarly to the first embodiment, in the present embodiment, an image display system, which displays the left-eye image and the right-eye image as parallax images for stereoscopic view to the screen SR in a time-divisional manner using the projector PJ, will be explained as an example.

The image display system according to the present embodiment is provided with the projector PJ, a polarization control device 1A, the screen SR, and the pair of observation spectacles 50. In FIG. 4, the constituents substantially the same as those of the first embodiment are attached with the same reference numerals. Hereinafter, only the configuration and the action in the second embodiment different from those of the first embodiment will be explained.

In the polarization control device 1A according to the second embodiment shown in FIG. 4, the point in which the polarization control device 1A is different from the polarization control device 1 according to the first embodiment shown in FIG. 1 is the configuration in which the liquid crystal panel 12 is replaced with a liquid crystal panel 12A and a liquid crystal panel 12B. In other words, the second polarizing liquid crystal panel includes the liquid crystal panel 12A as the first liquid crystal panel and the liquid crystal panel 12B as the second liquid crystal panel.

Specifically, in the first embodiment, the configuration of converting the vertically polarized light (the first polarization) into the right circularly polarized light (the third polarization) or the left circularly polarized light (the fourth polarization) is described in detail.

The liquid crystal panel 12A as the first liquid crystal panel of the second polarizing liquid crystal panel in the present embodiment includes liquid crystal as an electro-optic material, a pair of light transmissive substrates between which the liquid crystal is hermetically sealed and a polysilicon TFTs as the switching elements, for example. The liquid crystal panel 12A controls the orientation of the liquid crystal according to provided controlled signals so as to modulate incident polarized light. The liquid crystal panel 12A has the slow axis having an angle of 45° with the polarization axis of the vertical polarization, and when a voltage is applied to the liquid crystal panel 12A and the liquid crystal panel 12A is set to the ON state, the liquid crystal panel 12A generates the phase difference of ¼ wavelength in the thickness direction of the panel (the phase is retarded by ¼ wavelength).

Therefore, when the liquid crystal panel 12A is set to the ON state, the liquid crystal panel 12A converts the outgoing light L2 with the vertical polarization (the first polarization) input thereto into the right circularly polarized light (the third polarization).

On the other hand, the liquid crystal panel 12B as the second liquid crystal panel of the second polarizing liquid crystal panel in the present embodiment includes liquid crystal as an electro-optic material, a pair of light transmissive substrates between which the liquid crystal is hermetically sealed and a polysilicon TFTs as the switching elements, for example. The liquid crystal panel 12A controls the orientation of the liquid crystal according to provided controlled signals so as to modulate incident polarized light. The liquid crystal panel 12B has the slow axis having an angle of 135° with the polarization axis of the vertical polarization, and when a voltage is applied to the liquid crystal panel 12B and the liquid crystal panel 12B is set to the ON state, the liquid crystal panel 12B generates the phase difference of ¼ wavelength in the thickness direction of the panel (the phase is led by ¼ wavelength).

Therefore, when the liquid crystal panel 12B is set to the ON state, the liquid crystal panel 12B converts the outgoing light L2 with the vertical polarization (the first polarization) input thereto into the left circularly polarized light (the fourth polarization).

Figure 5:
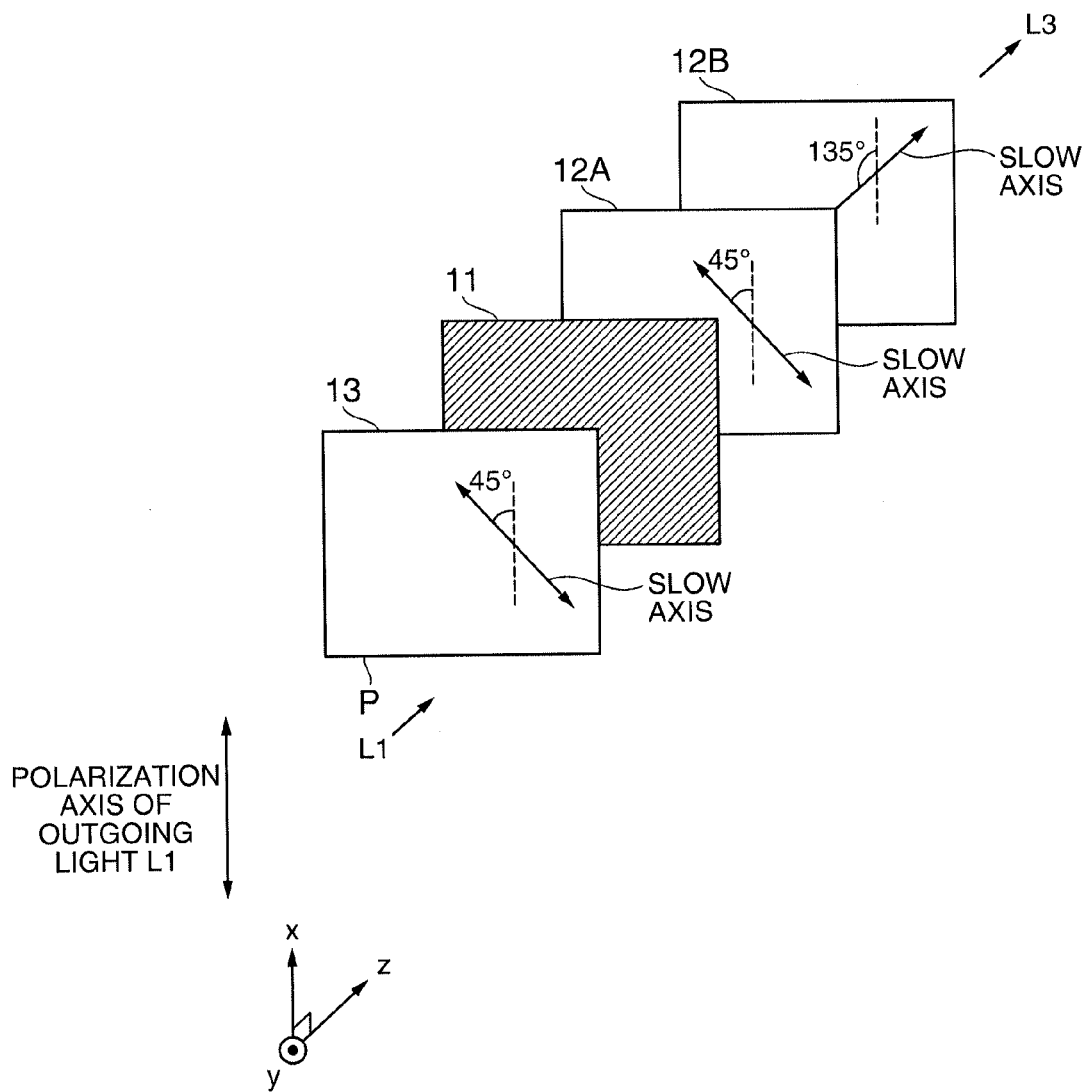
FIG. 5 is a conceptual diagram showing an arrangement order of a polarization plate 11, a liquid crystal panel 12A, a liquid crystal panel 12B, and a polarizing liquid crystal panel 13 in the present embodiment.

Then, FIG. 5 is a conceptual diagram showing an arrangement order of the polarization plate 11, the liquid crystal panel 12A, the liquid crystal panel 12B, and the polarizing liquid crystal panel 13 in the present embodiment.

The polarizing liquid crystal panel 13, the polarization plate 11, the liquid crystal panel 12A, and the liquid crystal panel 12B are arranged in this order in the direction of the propagating direction P (the arrow P) of the outgoing light L1 emitted from the projector PJ. As shown in FIG. 5, the slow axis of the polarizing liquid crystal panel 13 has an angle of 45° with the polarization axis of the outgoing light L1 with the vertical polarization. Further, the slow axis of the liquid crystal panel 12A has an angle of 45° with the polarization axis of the outgoing light L1 with the vertical polarization. The slow axis of the liquid crystal panel 12B has an angle of 135°) (−45° with the polarization axis of the outgoing light L1 with the vertical polarization.

In the present embodiment, the control section 10 applies the voltage to the liquid crystal panel 12A to thereby set the liquid crystal panel 12A to the ON state during the period T1 for emitting the right-eye image while setting the liquid crystal panel 12B to the OFF state without applying the voltage thereto.

Thus, the phase difference of ¼ wavelength occurs in the liquid crystal panel 12A due to the ON state, and the liquid crystal panel 12A converts the first outgoing light L2R input thereto as the vertically polarized light (the first polarization) into the right circularly polarized light (the third polarization), and then emits it to the liquid crystal panel 12B.

In this case, the phase difference of ¼ wavelength fails to occur in the liquid crystal panel 12B due to the OFF state, and the liquid crystal panel 12B transmits the first outgoing light L2R having converted into the right circularly polarized light as the polarization state of the right circular polarization, and then emits it as the first outgoing light L3R with the right circular polarization.

On the other hand, the control section 10 sets the liquid crystal panel 12A to the OFF state without applying the voltage to the liquid crystal panel 12A during the period T2 for emitting the left-eye image while applying the voltage to the liquid crystal panel 12B to thereby set the liquid crystal panel 12B to the ON state.

Thus, the phase difference of ¼ wavelength fails to occur in the liquid crystal panel 12A due to the OFF state, and the liquid crystal panel 12A transmits the second outgoing light L2L with the vertical polarization directly, and then emits it to the liquid crystal panel 12B.

On this occasion, the phase difference of ¼ wavelength occurs in the liquid crystal panel 12B due to the ON state, and the liquid crystal panel 12B converts the second outgoing light L2L input thereto with the vertical polarization (the first polarization) into the left circularly polarized light (the fourth polarization), and then emits it as the second outgoing light L3L with the left circular polarization.

However, the third polarization and the forth polarization could be choose among linearly polarized light, elliptically polarized light and circularly polarized light, as long as the polarization directions of the third polarization and the forth polarization are different from each other. In other words, each angle of the slow axis directions of the liquid crystal panels 12A and 12B, and each applied voltages to the liquid crystal panels 12A and 12B could be appropriately set so that in the periods T1 the third polarization is emitted from the polarization control device 1A, and in the period T2 the fourth polarization is emitted from the polarization control device 1A.

Other configurations and processes than described above are the same as in the first embodiment. It should be noted that regarding the arrangement order of the liquid crystal panel 12A and the liquid crystal panel 12B, which one is ahead of the other with respect to the optical axis of the projector PJ does not matter. In other words, although the liquid crystal panel 12A and the liquid crystal panel 12B are arranged in this order in the present embodiment, the configuration of arranging the liquid crystal panel 12B and the liquid crystal panel 12A in this order can also be adopted. The liquid crystal panel 12A and the liquid crystal panel 12B can also be formed to have a configuration of being bonded to each other instead of the configuration of being separated from each other.

As described above, in the present embodiment, similarly to the first embodiment, the outgoing light L1 with the vertical polarization is converted into the outgoing light L1' with the horizontal polarization (the second polarization) by the polarizing liquid crystal panel 13 to thereby prevent the outgoing light L1 from being transmitted through the polarization plate 11 to set the state of the black display at the timing of switching from either one of the first outgoing light L1R of the right-eye image and the second outgoing light L1L of the left-eye image to the other, namely in the transition from either one of the periods T1 and T2 to the other for the time ΔTb from the commencement of the other period.

Accordingly even if the timing at which the liquid crystal molecular orientation of liquid crystal panels of the liquid crystal light valves 100R, 100G, and 100B in the projector PJ is varied and the timing at which the liquid crystal molecular orientation of the liquid crystal panels 12A and 12B is varied are different from each other, since light is not emit from the polarization control device 1A during the specified time ΔTb, the crosstalk is not visually recognized by the observer or the crosstalk is difficult to visually recognize by the observer.

Therefore, according to the present embodiment, it is possible to eliminate the crosstalk caused by either one of the first outgoing light L1R of the right-eye image and the second outgoing light L1L of the left-eye image seeping into the period of the other after switching from the one outgoing light to the other outgoing light, and it is possible for the observer to observe a high-quality stereoscopic image.

Third Embodiment

Figure 6:
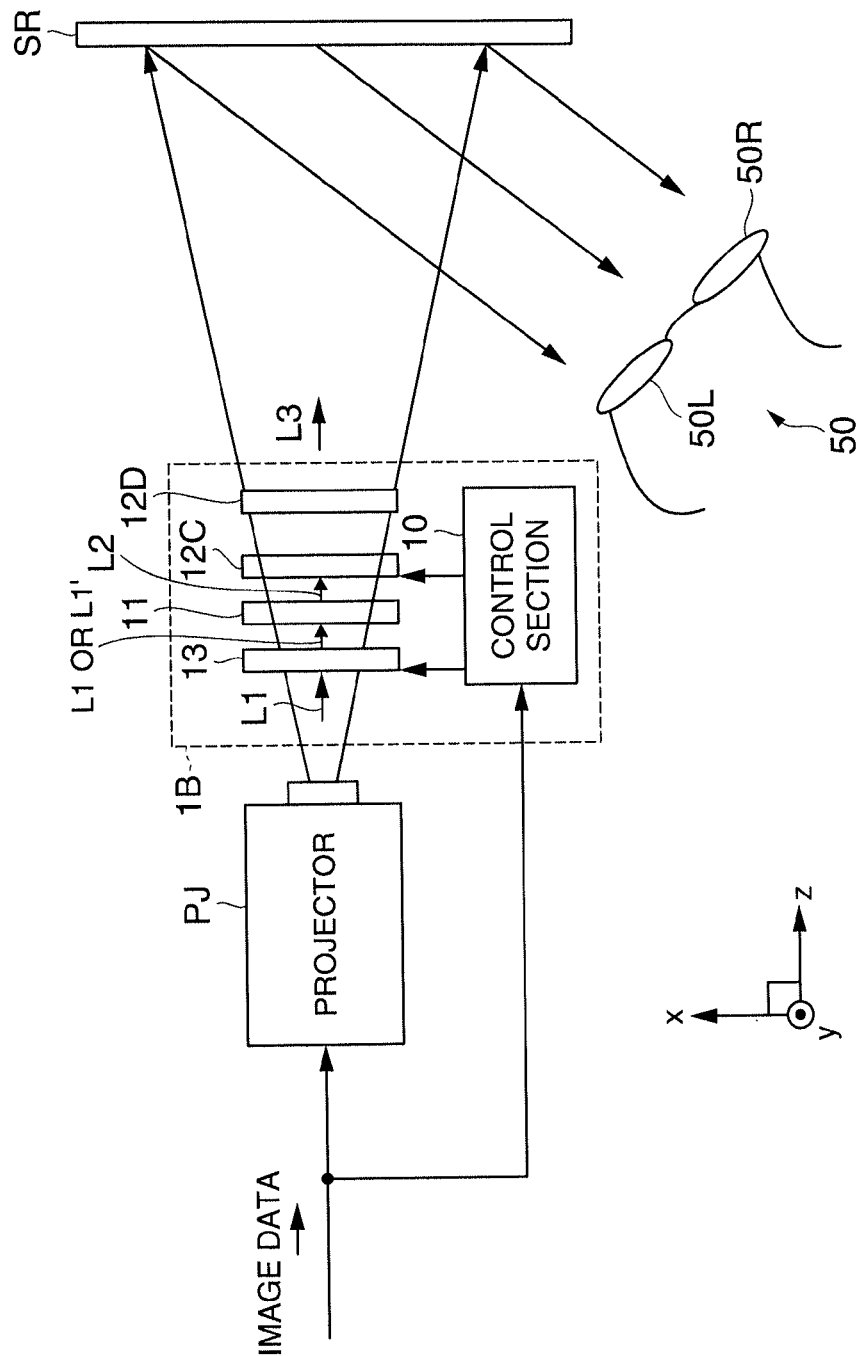
FIG. 6 is a schematic block diagram showing a configuration example of an image display system for performing stereoscopic view of an image using the polarization control device according to a third embodiment of the invention.

Then, a third embodiment of the invention will be explained with reference to the accompanying drawings. FIG. 6 is a schematic block diagram showing a configuration example of an image display system for performing stereoscopic view of an image using a polarization control device according to the third embodiment of the invention. Similarly to the first embodiment, in the present embodiment, an image display system, which displays the left-eye image and the right-eye image as parallax images for stereoscopic view to the screen SR in a time-divisional manner using the projector PJ, will be explained as an example.

The image display system according to the present embodiment is provided with the projector PJ, a polarization control device 1B, the screen SR, and the pair of observation spectacles 50. In FIG. 6, the constituents substantially the same as those of the first embodiment are attached with the same reference numerals. Hereinafter, only the configuration and the action in the third embodiment different from those of the first embodiment will be explained.

In the polarization control device 1B according to the third embodiment shown in FIG. 6, the point in which the polarization control device 1B is different from the polarization control device 1 according to the first embodiment shown in FIG. 1 is the configuration in which the liquid crystal panel 12 is replaced with a liquid crystal panel 12C and a retarder 12D. In other words, the second polarizing liquid crystal panel includes the liquid crystal panel 12C as the first polarizing panel and the retarder 12D.

Specifically, in the first embodiment, the configuration of converting the vertically polarized light (the first polarization) into the right circularly polarized light (the third polarization) or the left circularly polarized light (the fourth polarization) is described in detail.

The liquid crystal panel 12C as the first polarizing panel of the second polarizing liquid crystal panel in the present embodiment includes liquid crystal as an electro-optic material, a pair of light transmissive substrates between which the liquid crystal is hermetically sealed and a polysilicon TFTs as the switching elements, for example. The liquid crystal panel 12C controls the orientation of the liquid crystal according to provided controlled signals so as to modulate incident polarized light. The liquid crystal panel 12C has the slow axis having an angle of 45° with the polarization axis of the vertical polarization, and when a voltage is applied to the liquid crystal panel 12C and the liquid crystal panel 12C is set to the ON state, the liquid crystal panel 12C generates the phase difference of ½ wavelength in the thickness direction of the panel.

Therefore, when being set to the ON state, the liquid crystal panel 12C rotates the phase axis of the outgoing light L2 with the vertical polarization input thereto by 90° to thereby convert it into the horizontally polarized light, and then emits it. When being set to the OFF state, the liquid crystal panel 12C emits the outgoing light L2 with the vertical polarization directly as the vertically polarized light.

Incidentally, the retarder 12D has the slow axis having an angle of 135° with the polarization axis of the vertical polarization, and further, has the phase difference of ¼ wavelength in the thickness direction of the plate.

Therefore, the retarder 12D converts the horizontally polarized light input thereto into the right circularly polarized light, and converts the vertically polarized light input thereto into the left circularly polarized light.

Figure 7:
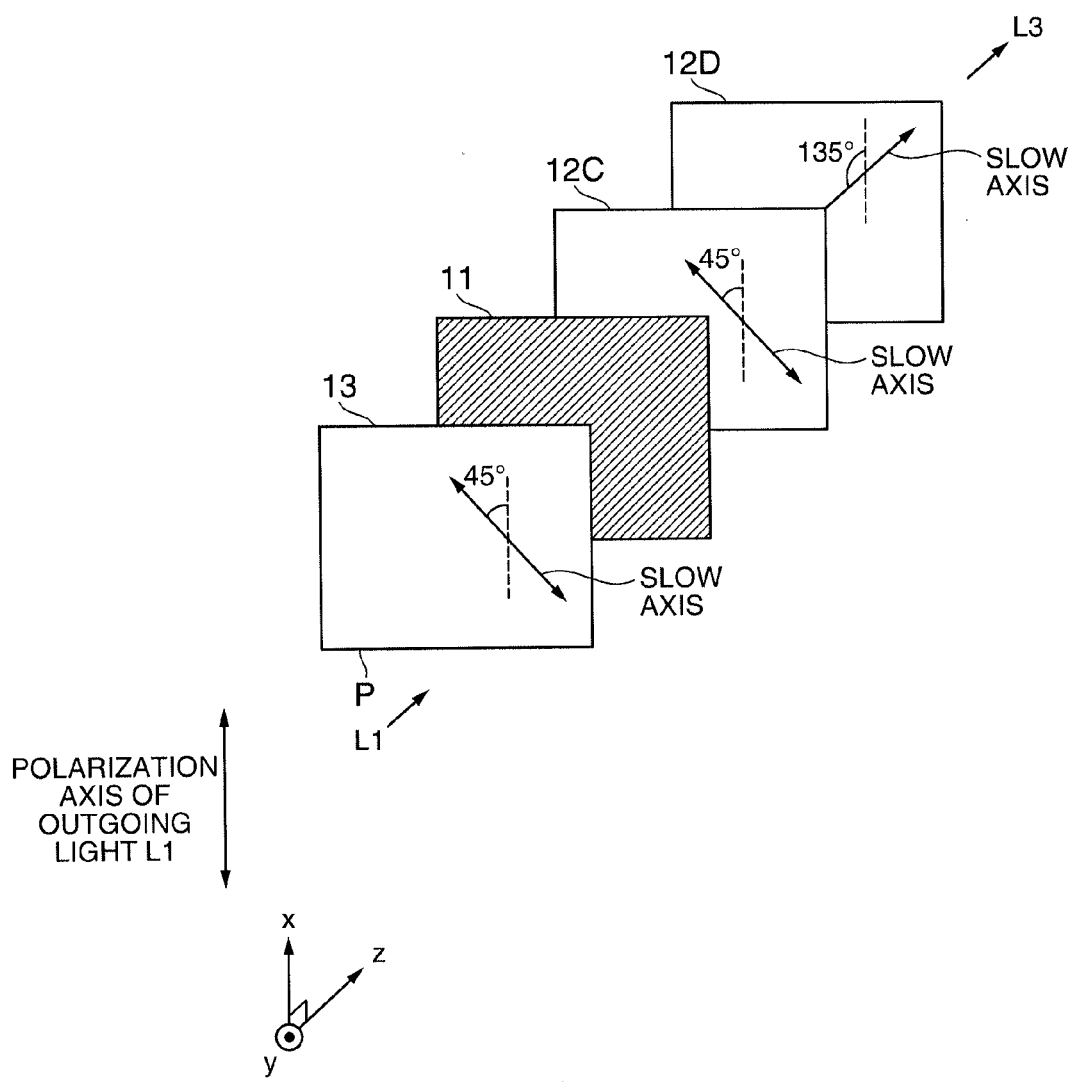
FIG. 7 is a conceptual diagram showing an arrangement order of a polarization plate 11, a liquid crystal panel 12C, a retarder 12D, and a polarizing liquid crystal panel 13 in the present embodiment.
Figure 8:
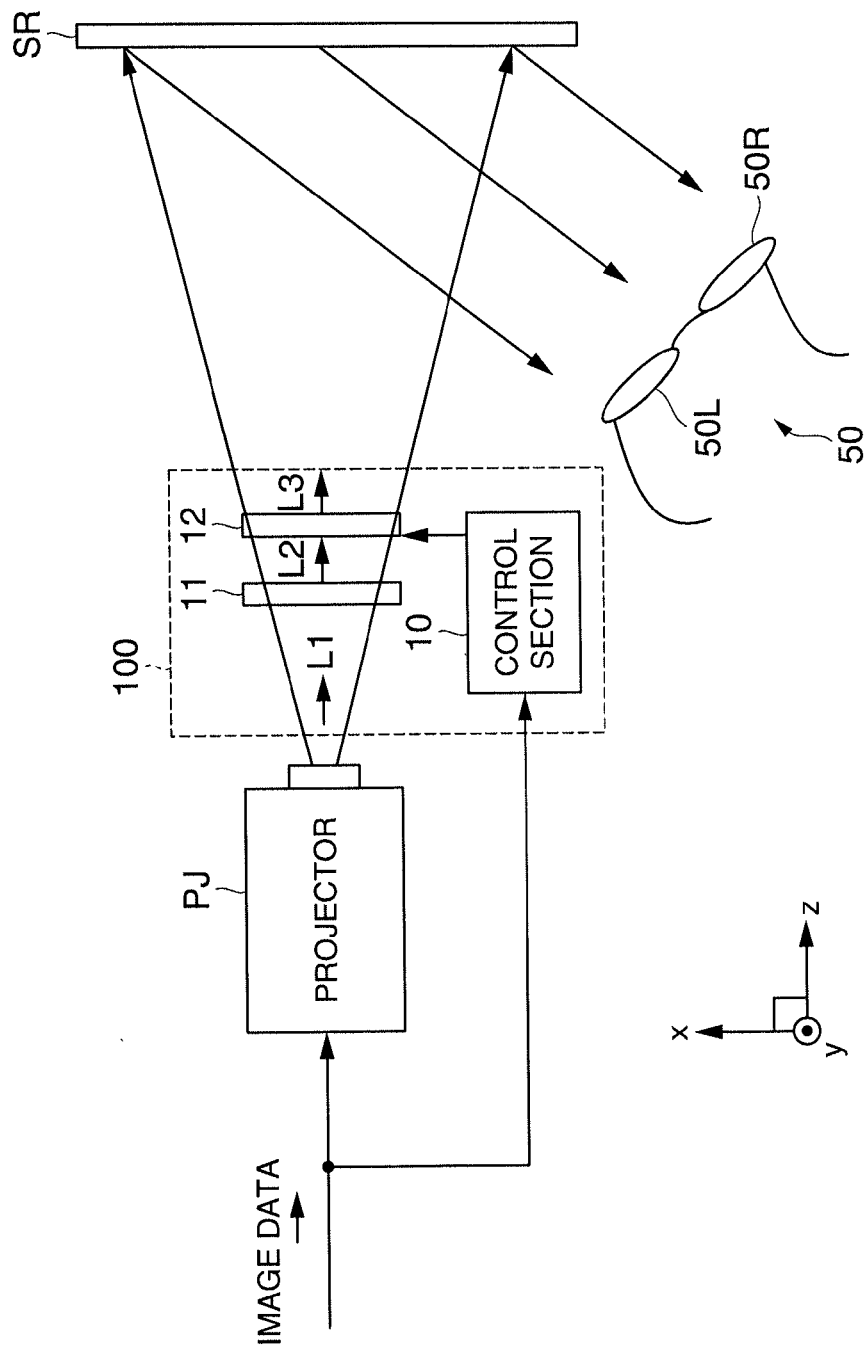
FIG. 8 is a block diagram showing a configuration example of an image display system according to a related art example.

Then, FIG. 7 is a conceptual diagram showing an arrangement order of the polarization plate 11, the liquid crystal panel 12C, the retarder 12D, and the polarizing liquid crystal panel 13 in the present embodiment.

The polarizing liquid crystal panel 13, the polarization plate 11, the liquid crystal panel 12C, and the retarder 12D are arranged in this order in the direction of the propagating direction P (the arrow P) of the first outgoing light L1R emitted from the projector PJ. As shown in FIG. 7, the slow axis of the polarizing liquid crystal panel 13 has an angle of 45° with the polarization axis of the outgoing light L1 with the vertical polarization. Further, the slow axis of the liquid crystal panel 12C has an angle of 45° with the polarization axis of the outgoing light L1 with the vertical polarization. The slow axis of the retarder 12D has an angle of 135° (–45° with the polarization axis of the outgoing light L1 with the vertical polarization.

In the present embodiment, the control section 10 applies the voltage to the liquid crystal panel 12C to thereby set the liquid crystal panel 12C to the ON state during the period T1 for emitting the right-eye image.

Thus, the phase difference of ½ wavelength occurs in the liquid crystal panel 12C due to the ON state, and the liquid crystal panel 12C converts the first outgoing light L2R input thereto with the vertical polarization (the first polarization) into the horizontally polarized light (the second polarization), and then emits it to the retarder 12D.

Then, the retarder 12D converts the first outgoing light L2R having converted into the horizontally polarized light (the second polarization) into the right circularly polarized light (the third polarization) to thereby transmit it, and then emits it as the first outgoing light L3R with the right circular polarization (the third polarization).

On the other hand, the control section 10 sets the liquid crystal panel 12C to the OFF state without applying the voltage to the liquid crystal panel 12C during the period T2 for emitting the left-eye image.

Thus, the phase difference of ½ wavelength fails to occur in the liquid crystal panel 12C due to the OFF state, and the liquid crystal panel 12C transmits the second outgoing light L2L with the vertical polarization (the first polarization) directly, and then emits it to the retarder 12D.

On this occasion, the retarder 12D converts the second outgoing light L2L input thereto with the vertical polarization (the first polarization) into the left circularly polarized light (the fourth polarization), and then emits it as the second outgoing light L3L with the left circular polarization (the fourth polarization).

Other configurations and processes than described above are the same as in the first embodiment. It should be noted that the liquid crystal panel 12C and the retarder 12D can also be formed to have a configuration of being bonded to each other instead of the configuration of being separated from each other.

Further, regarding the arrangement order of the liquid crystal panel 12C and the retarder 12D, which one is disposed in front of the other with respect to the optical axis of the projector PJ does not matter. In other words, although the liquid crystal panel 12C and the retarder 12D are arranged in this order in the present embodiment, the configuration of arranging the retarder 12D and the liquid crystal panel 12C in this order can also be adopted.

If the retarder 12D is disposed in front of the liquid crystal panel 12C, the retarder 12D converts both of the first outgoing light L2R and the second outgoing light L2L input thereto as the vertically polarized light (the first polarization) into the left circularly polarized light (the forth polarization), and then emits it to the liquid crystal panel 12C. The liquid crystal panel 12C is set to the ON state during the period T1 for emitting the first outgoing light L3R of the right-eye image, and therefore, polarizes the first outgoing light L2R with the left circular polarization (the fourth polarization) into the right circularly polarized light (the third polarization), and then emits the first outgoing light L3R of the right-eye image. Further, the liquid crystal panel 12C is set to the OFF state during the period T2 for emitting the second outgoing light L3L of the left-eye image, and therefore, transmits the second outgoing light L2L with the left circular polarization (the fourth polarization) directly as the left circularly polarized light (the fourth polarization), and then emits it as the second outgoing light L3L.

However, the third polarization and the forth polarization could be choose among linearly polarized light, elliptically polarized light and circularly polarized light, as long as the polarization directions of the third polarization and the forth polarization are different from each other. In other words, each angle of the slow axis directions of the liquid crystal panel 12c and the retarder 12D, and the applied voltage to the liquid crystal panel 12C could be appropriately set so that in the periods T1 the third polarization is emitted from the polarization control device 1B, and in the period T2 the fourth polarization is emitted from the polarization control device 1B.

As described above, in the present embodiment, similarly to the first embodiment and the second embodiment, the outgoing light L1 with the vertical polarization is converted into the outgoing light L1' with the horizontal polarization by the polarizing liquid crystal panel 13 to thereby prevent the outgoing light L1 from being transmitted through the polarization plate 11 to set the state of the black display at the timing of switching from either one of the first outgoing light L1R of the right-eye image and the second outgoing light L1L of the left-eye image to the other, namely in the transition from either one of the periods T1 and T2 to the other for the time ΔTb from the commencement of the other period.

Accordingly even if the timing at which the liquid crystal molecular orientation of liquid crystal panels of the liquid crystal light valves 100R, 100G, and 100B in the projector PJ is varied and the timing at which the liquid crystal molecular orientation of the liquid crystal panels 12C is varied are different from each other, since light is not emit from the polarization control device 1B during the specified time ΔTb, the crosstalk is not visually recognized by the observer or the crosstalk is difficult to visually recognize by the observer.

Therefore, according to the present embodiment, it is possible to eliminate the crosstalk caused by either one of the first outgoing light L1R of the right-eye image and the second outgoing light L1L of the left-eye image seeping into the period of the other after switching from the one outgoing light to the other outgoing light, and it is possible for the observer to observe a high-quality stereoscopic image.

Further, although not described in detail in each of the embodiments described above for the sake of simplification of explanation, in the case of using the projector PJ, the polarized light entering the pair of observation spectacles 50 of the observer has been reflected by the screen SR to thereby reverse the polarization characteristics between the right and left sides, and further the left-eye image and the right-eye image have also been reversed. Therefore, in reality, it is arranged that the projector PJ emits the projection light of the left-eye image and the right-eye image reversed from each other using the mirror-reversed polarized lights.

Further, in the embodiments as described above, the polarization direction of the outgoing light L1, the slow axis direction of the polarizing liquid crystal panel 13, the liquid crystal panels 12, 12A, 12B and 12C, the transmission axis direction of the polarization plate 11, and the slow axis direction of the retarder 12D could be appropriately changed.

For example, when the transmission axis direction of the polarization plate 11 is the horizontal direction, the polarization plate 11 could absorb or reflect the outgoing light L1 with the vertical polarization emitted from the polarizing liquid crystal panel 13 applied no voltage to be the state of the black display during the specified time ΔTb from the commencement of each period of the periods T1 and T2, and the polarization plate 11 could transmit the outgoing light L1 with the horizontal polarization emitted from the polarizing liquid crystal panel 13 applied voltage to be the state of the projecting image after a lapse of the specified time ΔTb. In this case, the slow axis direction of the liquid crystal panels 12, 12A, 12B and 12C, the slow axis direction of the retarder 12D and the timing to apply the voltage to the liquid crystal panels 12, 12A, 12B and 12C could be appropriately set so that the outgoing light L2 with the horizontal polarization emitted from the polarization plate 11 converts into the outgoing light L3 with the polarization state that differ between the period T1 and the period T2.

In other words, the polarization direction of the first outgoing light L1R and the second outgoing light L1L form the projector PJ, the transmission axis direction of the polarization plate 11, the slow axis direction of the polarizing liquid crystal panel 13 and the timing to apply the voltage to the polarizing liquid crystal panel 13 could be appropriately set so that the first outgoing light L1R and the second outgoing light L1L form the projector PJ are absorbed or reflected at the polarization plate 11 during the specified time ΔTb from the commencement of the other period, and after a lapse of the specified time ΔTb, the first outgoing light L1R and the second outgoing light L1L form the projector PJ are transmitted through the polarization plate 11. Furthermore, the slow axis direction of the liquid crystal panels 12, 12A, 12B and 12C, the slow axis direction of the retarder 12D and the timing to apply the voltage to the liquid crystal panels 12, 12A, 12B and 12C could be appropriately set so that the outgoing light L2 transmitted through the polarization plate 11 converts into the outgoing light L3 with the polarization state that differ between the period T1 and the period T2 in sync with the process of switching between the periods T1 and T2.

Further, it is also possible to record a program for realizing the function of the control section 10 shown in FIGS. 1, 4 and 6 on a computer-readable recording medium, then make a computer system retrieve the program recorded on the recording medium, and then execute the program to thereby perform the ON/OFF control of applying the voltage to each of the liquid crystal panels in each of the polarization control device 1, 1A, and 1B. It should be noted that the "computer system" mentioned here should include an OS and the hardware such as the peripheral devices.

Further, in the case of using the WWW system, the "computer system" should include a home page providing environment (or display environment).

Further, the "computer-readable recording medium" denotes a portable recording medium such as a flexible disk, a magneto-optical disk, a ROM, and a CD-ROM, and a storage device such as a hard disk incorporated in the computer system. Further, the "computer-readable recording medium" should include those dynamically holding a program for a short period of time such as a communication line in the case of transmitting the program via a communication line such as a telephone line or a network such as the Internet, and those holding a program for a certain period of time such as a volatile memory in a server or a computer system to be a client in that occasion. Further, the program described above can be those for partially realizing the functions described above, or those realizing the functions described above in combination with a program having already been recorded on the computer system.

Although the embodiments of the invention are hereinabove described in detail with reference to the accompanying drawings, the specific configuration is not limited to the embodiments described above, but the design and so on within the scope or the spirit of the invention are also included therein.

The entire disclosure of Japanese Patent Application No. 2012-015703, filed Jan. 27, 2012 and Japanese Patent Application No. 2013-003923, filed Jan. 11, 2013 are expressly incorporated by reference herein.

What is claimed is:

1. A polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other, and then emit the first outgoing light and the second outgoing light, the polarization control device comprising:
a first polarizing liquid crystal panel adapted to convert polarization of the first outgoing light and the second outgoing light into a second polarization having a polarization direction different by 90° from a first polarization, and emit the first outgoing light and the second outgoing light during a specified time of time from a time point when the external device performs a process of switching from either one of the first outgoing light and the second outgoing light to the other in sync with the process of switching by the external device;

a polarization plate having a transmission axis having a polarization direction coinciding with the first polarization; and a second polarizing liquid crystal panel adapted to convert the first polarization of each of the first outgoing light and the second outgoing light input through the polarization plate into third polarization and fourth polarization having respective polarization directions different from each other, and then emit the result in every predetermined period.

2. The polarization control device according to claim 1, wherein the second polarizing liquid crystal panel includes a first polarization panel adapted to polarize the first outgoing light from the first polarization to the third polarization and then emit the first outgoing light in the period of the right-eye image, and emit the second outgoing light directly as the first polarization in the period of the left-eye image, and a second polarization panel adapted to emit the first outgoing light emitted from the first polarization panel directly as the third polarization in the period of the right-eye image, and polarize the second outgoing light emitted from the first polarization panel from the first polarization to the fourth polarization and then emit the second outgoing light in the period of the left-eye image.

3. The polarization control device according to claim 1, wherein the first polarization is first linear polarization, the second polarization is second linear polarization having a polarization axis having an angle of 90° with a polarization axis of the first linear polarization, the third polarization is either one of left circular polarization and right circular polarization, and the fourth polarization is the other of the left circular polarization and the right circular polarization, and the second polarizing liquid crystal panel includes a first polarization panel adapted to emit the first outgoing light directly as the first polarization in the period of the right-eye image, and polarize the second outgoing light from the first polarization to the second polarization in the period of the left-eye image, and a retarder adapted to convert the first polarization into the third polarization, and convert the second polarization into the fourth polarization.

4. The polarization control device according to claim 1, wherein the first polarization is first linear polarization, the second polarization is second linear polarization having a polarization axis having an angle of 90° with polarization axis of the first linear polarization, the third polarization is either one of left circular polarization and right circular polarization, and the fourth polarization is the other of the left circular polarization and the right circular polarization, and the second polarizing liquid crystal panel includes a retarder adapted to polarize the first outgoing light and the second outgoing light from the first polarization to the fourth polarization, and then emits the result, and a first polarization panel adapted to polarize the fourth polarization emitted from the retarder to the third polarization and then emit the result in the period of the right-eye image, and emits the fourth polarization directly as the fourth polarization in the period of the left-eye image.

5. An image display system comprising:

an image display device adapted to supply first outgoing light of a right-eye image and second outgoing light of a left-eye image as outgoing lights of parallax images for stereoscopic view in a time-divisional manner with a predetermined period;

the polarization control device according to claim 1 adapted to emit the first outgoing light of the right-eye image with the third polarization, and emit the second outgoing light of the left-eye image with the fourth polarization different from the third polarization; and a pair of observation spectacles having an optical element having a property of transmitting the first outgoing light disposed on a right-eye side, and having an optical element having a property of transmitting the second outgoing light disposed on a left-eye side.

6. An image display system comprising:

an image display device adapted to supply first outgoing light of a right-eye image and second outgoing light of a left-eye image as outgoing lights of parallax images for stereoscopic view in a time-divisional manner with a predetermined period;

the polarization control device according to claim 2 adapted to emit the first outgoing light of the right-eye image with the third polarization, and emit the second outgoing light of the left-eye image with the fourth polarization different from the third polarization; and a pair of observation spectacles having an optical element having a property of transmitting the first outgoing light disposed on a right-eye side, and having an optical element having a property of transmitting the second outgoing light disposed on a left-eye side.

7. An image display system comprising:

an image display device adapted to supply first outgoing light of a right-eye image and second outgoing light of a left-eye image as outgoing lights of parallax images for stereoscopic view in a time-divisional manner with a predetermined period;

the polarization control device according to claim 3 adapted to emit the first outgoing light of the right-eye image with the third polarization, and emit the second outgoing light of the left-eye image with the fourth polarization different from the third polarization; and a pair of observation spectacles having an optical element having a property of transmitting the first outgoing light disposed on a right-eye side, and having an optical element having a property of transmitting the second outgoing light disposed on a left-eye side.

8. An image display system comprising:

an image display device adapted to supply first outgoing light of a right-eye image and second outgoing light of a left-eye image as outgoing lights of parallax images for stereoscopic view in a time-divisional manner with a predetermined period;

the polarization control device according to claim 4 adapted to emit the first outgoing light of the right-eye image with the third polarization, and emit the second outgoing light of the left-eye image with the fourth polarization different from the third polarization; and a pair of observation spectacles having an optical element having a property of transmitting the first outgoing light disposed on a right-eye side, and having an optical element having a property of transmitting the second outgoing light disposed on a left-eye side.

9. A polarization control method adapted to control a polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other, and then emit the first outgoing light and the second outgoing light, the method comprising:
converting polarization of the first outgoing light and the second outgoing light into a second polarization having a polarization direction different by 90° from a first polarization, and emitting the first outgoing light and the second outgoing light during a specified time of time from a time point when the external device performs a process of switching from either one of the first outgoing light and the second outgoing light to the other in sync with the process of switching by the external device using a first polarizing liquid crystal panel; and converting the first polarization of each of the first outgoing light and the second outgoing light input through the polarization plate having a transmission axis having a polarization direction coinciding with the first polarization into third polarization and fourth polarization having respective polarization directions different from each other in every predetermined period, and then emitting the result using a second polarizing liquid crystal panel.

10. A polarization control device supplied with a first outgoing light of a right-eye image and a second outgoing light of a left-eye image, which are outgoing lights of parallax images for stereoscopic view from an external device in a time-divisional manner with a predetermined period, and adapted to convert polarization directions of the first outgoing light and the second outgoing light so as to be different from each other, the polarization control device comprising:

a first polarizing liquid crystal panel adapted to switch polarization directions of the first outgoing light and the second outgoing light between a first polarization and a second polarization having a polarization direction different by 90° from the first polarization;

a polarization plate that transmits light of the first polarization from the first polarizing liquid crystal panel, and absorbs or reflects light of the second polarization from the first polarizing liquid crystal panel; and a second polarizing liquid crystal panel adapted to convert the first polarization transmitted through the polarization plate into a third polarization and a fourth polarization having a polarization direction different from the third polarization in turn in sync with the predetermined period, the first polarizing liquid crystal panel converting the polarization direction of the first outgoing light and the second outgoing light so that the light of the second polarization is emitted from the first polarizing liquid crystal panel during a specified time of time from a time point when the external device performs a process of switching from either one of the first outgoing light and the second outgoing light to the other in sync with the process of switching by the external device and the light of the first polarization is emitted from the first polarizing liquid crystal panel after a lapse of the specified time.

11. The polarization control device according to claim 10, wherein
the second polarizing liquid crystal panel includes a first polarization panel and a second polarization panel,
the first polarization panel is adapted to convert the polarization direction of incident light of the first polarization into the third polarization during either one of the period of the right-eye image and the period of the left-eye image, and not convert the polarization direction of incident light during the other of the period of the right-eye image and the period of the left-eye image, and
the second polarization panel is adapted to convert the polarization direction of incident light of the first polarization into the fourth polarization during the other of the period of the right-eye image and the period of the left-eye image, and not convert the polarization direction of incident light during the one of the period of the right-eye image and the period of the left-eye image.

12. The polarization control device according to claim 10, wherein
the second polarizing liquid crystal panel includes a first polarization panel and a retarder,
the first polarization panel is adapted to not convert the polarization direction of incident light during either one of the period of the right-eye image and the period of the left-eye image, and convert the polarization direction of incident light into the polarization direction that is different from the polarization direction of the incident light in 90 degrees during the other of the period of the right-eye image and the period of the left-eye image, and
the retarder is disposed on either one side of a light incident side and a light outgoing side of the first polarization panel and has a retardation of quarter-wavelength.

13. An image display system comprising:
an image display device having an liquid crystal panel adapted to emit a first outgoing light of a right-eye image and a second outgoing light of a left-eye image as outgoing lights of parallax images for stereoscopic view in a time-divisional manner with a predetermined period;
a polarization control device according to claim 10 adapted to convert either one of the first outgoing light and the second outgoing light into the third polarization, and convert other of the first outgoing light and the second outgoing light into the fourth polarization different from the third polarization; and
a pair of observation spectacles having an optical element having a property of transmitting the first outgoing light disposed on a right-eye side, and having an optical element having a property of transmitting the second outgoing light disposed on a left-eye side.

14. An image display system comprising:
an image display device having an liquid crystal panel adapted to emit a first outgoing light of a right-eye image and a second outgoing light of a left-eye image as outgoing lights of parallax images for stereoscopic view in a time-divisional manner with a predetermined period;
a polarization control device according to claim 11 adapted to convert either one of the first outgoing light and the second outgoing light into the third polarization, and convert other of the first outgoing light and the second outgoing light into the fourth polarization different from the third polarization; and
a pair of observation spectacles having an optical element having a property of transmitting the first outgoing light disposed on a right-eye side, and having an optical element having a property of transmitting the second outgoing light disposed on a left-eye side.

15. An image display system comprising:
- an image display device having an liquid crystal panel adapted to emit a first outgoing light of a right-eye image and a second outgoing light of a left-eye image as outgoing lights of parallax images for stereoscopic view in a time-divisional manner with a predetermined period;
- a polarization control device according to claim 12 adapted to convert either one of the first outgoing light and the second outgoing light into the third polarization, and convert other of the first outgoing light and the second outgoing light into the fourth polarization different from the third polarization; and
- a pair of observation spectacles having an optical element having a property of transmitting the first outgoing light disposed on a right-eye side, and having an optical element having a property of transmitting the second outgoing light disposed on a left-eye side.

* * * * *